United States Patent
Yamamoto et al.

(10) Patent No.: US 6,462,834 B1
(45) Date of Patent: *Oct. 8, 2002

(54) IMAGE PROCESSING SYSTEM WHICH FORMS TWO-COLOR IMAGES

(75) Inventors: Masahito Yamamoto, Yokohama; Hideki Adachi, Kawasaki; Yoshiyuki Suzuki, Yokohama; Kazuhiko Hirooka, Tokyo; Hiroyuki Ichikawa, Kawasaki; Tetsuya Nozaki, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,194

(22) Filed: Feb. 5, 1998

Related U.S. Application Data

(63) Continuation of application No. 08/330,665, filed on Oct. 28, 1994, now abandoned.

(30) Foreign Application Priority Data

Oct. 29, 1993 (JP) .............................................. 5-272704

(51) Int. Cl.⁷ ........................ G06F 13/00; G06F 15/00; H04N 1/46
(52) U.S. Cl. ........................ 358/1.9; 358/1.15; 358/515
(58) Field of Search ............................... 358/518, 520, 358/515, 523, 529, 538, 539, 540, 1.9, 1.1, 1.15, 434; 382/162, 163, 167

(56) References Cited

U.S. PATENT DOCUMENTS

| 4,577,218 A | | 3/1986 | Kurata ........................ 358/75 |
| 4,805,016 A | * | 2/1989 | Kato ........................... 358/500 |
| 4,825,246 A | | 4/1989 | Fukuchi et al. .................. 355/4 |
| 4,847,654 A | | 7/1989 | Honma et al. ................ 358/300 |
| 4,873,570 A | | 10/1989 | Suzuki et al. .................. 358/80 |
| 4,926,253 A | | 5/1990 | Nakashima et al. ........... 358/75 |
| 4,929,979 A | * | 5/1990 | Kimoto ........................ 355/38 |
| 4,982,277 A | | 1/1991 | Katoh et al. ................... 358/80 |
| 4,989,079 A | | 1/1991 | Ito ............................... 358/80 |
| 4,996,591 A | | 2/1991 | Kadowaki et al. ............. 358/80 |
| 5,132,786 A | | 7/1992 | Ishiwata ....................... 358/75 |
| 5,134,667 A | * | 7/1992 | Suzuki ........................ 358/520 |
| 5,138,443 A | | 8/1992 | Ikeda et al. .................... 358/80 |
| 5,220,620 A | | 6/1993 | Nakano et al. ................ 382/17 |
| 5,231,482 A | * | 7/1993 | Murakami .................... 358/520 |
| 5,398,124 A | | 3/1995 | Hirota ......................... 358/530 |
| 5,450,216 A | | 9/1995 | Kasson ........................ 358/518 |
| 5,459,590 A | | 10/1995 | Bleker et al. ................. 358/518 |
| 5,489,989 A | | 2/1996 | Shimizu et al. .............. 358/401 |
| 5,489,998 A | | 2/1996 | Yamada et al. ............... 358/523 |
| 5,495,348 A | | 2/1996 | Sakai et al. ................... 358/501 |
| 5,581,359 A | | 12/1996 | Kaburagi et al. ............. 358/298 |
| 5,581,375 A | | 12/1996 | Ma ............................. 358/518 |
| 5,595,348 A | | 1/1997 | Barone et al. ................. 241/36 |
| 5,668,890 A | * | 9/1997 | Winkelman ................. 382/167 |
| 5,680,230 A | * | 10/1997 | Kaburagi ..................... 358/520 |

FOREIGN PATENT DOCUMENTS

| DE | 4139174 | 6/1992 | ............ H04N/1/46 |
| EP | 0388877 | 9/1990 | ............ G06F/15/70 |
| EP | 0596505 | 5/1994 | ............ H04N/1/46 |

\* cited by examiner

*Primary Examiner*—Madeleine Nguyen
(74) *Attorney, Agent, or Firm*—Fitzpatrick, Cella, Harper & Scinto

(57) ABSTRACT

The color determination circuit 308 detects hue of the color image information, and the controller 205 decides a color component to be separated (separation color) in accordance with the detected hue. Output color by the printer 204 is set in correspondence with the separation color. The two-color-separating circuit 303 separates the color image information into image information on at least two color components in accordance with the decided separation colors. The separated image information on the each color is transmitted to the printer 204 via printer density correction circuits 304 and 305, and a buffer 306. Thereby it is possible to provide an image processing apparatus capable of setting and changing the separation color and the output color by automatic operation or by simple manual operation, thus the expression of the image forming can be improved.

8 Claims, 18 Drawing Sheets

IMAGE PROCESSING SYSTEM WHICH FORMS TWO-COLOR IMAGES

This application is a continuation of application Ser. No. 08/330,665, filed Oct. 28, 1994, now abandoned.

BACKGROUND OF THE INVENTION

The present invention relates to an image processing method and apparatus capable of separating a plurality of colors from a color image signal and, more particularly, to a digital copy machine which separates red component and black component, for instance, from the read color image signal, then forms an image by expressing the red component with red color and the black component with black color.

A technique suggested according to U.S. Ser. No. 07/671,450 is, for a digital copy machine, to read a color original image by using a photoelectric converting element, such as a color CCD, and to discriminate an area in accordance with color information on the original image, then to express the discriminated area with a color which differs from a color representing the rest area (red and black, for instance).

Further, there is suggested a technique disclosed to separates a red component and a black component, for instance, from the read color image signal, then expresses the original image by using two colors which differ from each other. For example, the image is formed by using a red color for the red component and a black color for the black component.

An image forming apparatus, which forms an image by discriminating areas and expressing the areas with colors which differ from each other, is able to express a red character with red color in a case where the red character is included in a part of an original image which includes black-and-white. However, the apparatus is not suitable to express a full-color image since it forms an image by expressing each area with red color or black color.

Further, there are problems with an image forming apparatus which separates two color components from a full-color image and then expresses the image with two colors differing from each other, as described below.

(1) Colors for separation can not be designated or changed, since color components being separated from an original are limited to predetermined two colors;

(2) Colors for separation and colors for output can not be designated or changed freely, since the colors for separation and colors for output of image data which is separated in accordance with the colors for separation are limited to predetermined two colors for the entire image;

(3) If quality for expressing an image is to be improved by designating and changing colors for separation and colors for output of image data which is separated in accordance with the colors of separation, since more items needs to be designated, the operation of the apparatus becomes complicated and troublesome, and operational mistakes can result in many miss-copying; and (4) The image forming with red color is limited to the red component area of the original image, thus most part of the original image is formed with black color and quality for expressing image is low. Therefore an advantage of forming an image with two colors is not obtained.

SUMMARY OF THE INVENTION

Accordingly, it is a purpose of the present invention to provide an image processing apparatus and method which partially or totally solve the aforementioned problems relating to a digital copy machine that forms an image with two colors differing from each other.

The foregoing object is attained by providing an image processing apparatus comprising: detecting means for detecting hue of color image information; first deciding means for deciding a color component to be separated from the color image information in correspondence with the hue detected by the detecting means; second deciding means for deciding an output color corresponding to the color component decided by the first deciding means; separating means for separating image information with at least two color components from the color image information based on a result by the first deciding means; and output means for outputting the image information for the color component which is separated by the separating means as image information on the output colors decided by the second deciding means.

The foregoing object is also attained by providing an image processing method comprising: a detecting step of detecting hue of color image information; a first deciding step of deciding a color component to be separated from the color image information in correspondence with the hue detected at the detecting step; a second deciding step of deciding an output color corresponding to the color component decided at the first deciding step; a separating step of separating image information on at least two color components from the color image information based on a result at the first deciding step; and an output step of outputting the image information on the color components which is separated at the separating step as image information on the output colors decided at the second deciding step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail in accordance with the accompanying drawings.

[First Embodiment]

Figure 1:
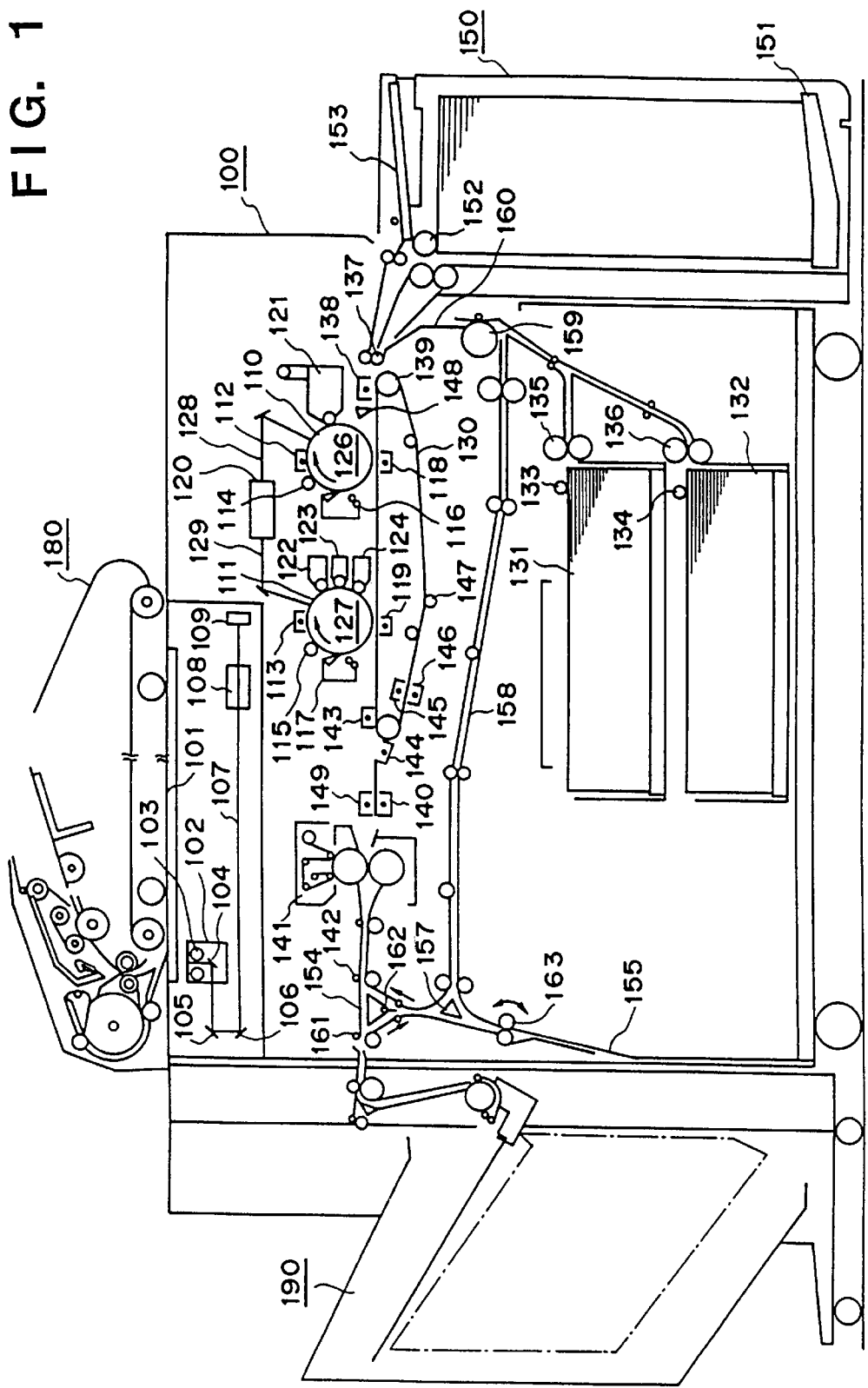
FIG. 1 is a schematic perspective view illustrating the configuration of a digital copy machine having an image processing apparatus according to a first embodiment of the present invention.

FIG. 1 is a schematic perspective view illustrating the configuration of a digital copy machine having an image processing apparatus according to a first embodiment of the present invention.

In FIG. 1, reference numeral 100 denotes a main body of a copying apparatus (described as 'main body' hereafter), reference numeral 180 denotes a recirculating type automatic document feeder (described as 'RDF' herein after), and reference numeral 190 denotes a sorter, and the RDF 180 and the sorter 190 can be freely placed and connected with the main body.

A configuration and an operation of the present embodiment is described below.

In the main body 100, reference numeral 101 denotes a platen glass where the original is placed and reference numeral 102 denotes a scanner 102 which is constructed with a document illuminating lamp 103, a scanning mirror 104, and so on. The scanner 102 is driven by a motor (not shown) to scan the original while moving back and forth in the predetermined direction. The reflected light 107 from the original is focused on a CCD sensor 109 through a lens 108, where the reflected light is guided to the lens 108 by scanning mirrors 104 to 106.

Reference numeral 120 denotes an exposure controller which is composed of a laser emission element, a polygon mirror scanner, and so on, and it irradiates laser beams 128 and 129 on photosensitive drums 110 and 111, where the laser beams are modulated in dependence upon an image signal which is converted to an electric signal at the CCD sensor 109, further processed by a predetermined image processes that will be explained later.

Around the photosensitive drum 110, there placed a primary corona discharge device 112, a black developer 121, a transfer corona discharge device 118, a cleaner 116, and a pre-exposure lamp 114, all of which construct a black image forming unit 126 altogether. Further, around the photosensitive drum 111, there placed a primary corona discharge device 113, a red developer 122, a blue developer 123, a green developer 124, a transfer corona discharge device 119, a cleaner 117, a pre-exposure lamp 115, all of which construct a color image forming unit 127 altogether. One of the developers 122 to 124 which is selected-by a developer switching means (not shown) is placed near the photosensitive drum 111, and the remaining developers are placed at a distance from the photosensitive drum 111.

In the black image forming unit 126, the photosensitive drum 110 rotates in the direction shown by an arrow in FIG. 1, driven by a motor which is not shown. After the photosensitive drum 110 is charged up to desired electric potential by the primary corona discharge device 112, the laser beam 128 is irradiated from an exposure controller 120, thereby an electrostatic latent image is formed on the surface of the photosensitive drum 110. The electrostatic latent image on the photosensitive drum 110 is developed by the black developer 121, thus the image can be visualized as a toner image.

Meanwhile, a recording paper sheet which is fed from an upper paper cassette 131 or a lower paper cassette 132 by either pick-up rollers 133 or 134 is conveyed to the image forming unit by paper feed rollers 135 or 136, further conveyed to a transfer belt 130 by a resistration roller 137. Then the visualized toner image on the photosensitive drum 110 is transferred to the recording paper sheet by the transfer corona discharge device 118. The cleaner 116 removes the left-over toner on the photosensitive drum after the transfer operation, and the residual electric charge is removed by the pre-exposure lamp 114. By performing a similar operation as described above, the visualized toner image is transferred on the recording paper sheet by a desired developer in the color image forming unit 127.

After the recording paper sheet to which the image is transferred is separated from the transfer belt 130, the toner image is re-charged by corona discharge devices 149 and 140 prior to fixing, then sent to a fixing device 141 so that the toner image is fixed by being applied pressure and heat, finally the recording paper sheet is conveyed to the outside of the main body 100 by an ejecting roller 142. The pre-fixing chargers 149 and 140 are for preventing the image from being disturbed by supplementing to the toner with potential to stick to the recording paper sheet.

Reference numeral 138 denotes an attracting corona discharge device which makes the transfer belt 130 attract the recording paper sheet sent from the resistration roller 137, 139, a transfer belt roller which drives the transfer belt 130 to rotate as well as causes the recording paper sheet to be charged by forming a pair with the attracting corona discharge device 138; and 148, a paper sensor which detects the leading edge of a recording paper sheet conveyed by the transfer belt 130, and generates a synchronizing signal to indicate the direction of the paper feeding (sub-scanning direction).

143, a charge removing corona discharge device which makes it easier for the recording paper sheet be separated from the transfer belt 130; 144, a separating corona discharge device which prevents the image from being disturbed by burble electric discharge when the recording paper sheet is separated from the transfer belt 130; 145 and 146, transfer belt charge removing corona discharge devices which remove electric charge from the transfer belt 130 to electrostatically initialize it; 147, a belt cleaner to remove pollution from the transfer belt 130

The main body 100 contains a deck 150 capable of storing, for instance, four-thousand sheets of the recording paper. A lifter 151 in the deck 150 moves upward corresponding to the amount of the remaining recording paper sheets so that the recording paper sheet on the top of the pile always touches a paper feed roller 152. Further, the main body also has a multi-manual paper feeder 153 capable of storing one-hundred sheets of the recording paper.

Furthermore, in FIG. 1, reference numeral 154 denotes a paper-ejecting flapper which switches routes for double-sided recording, overlay recording, and ejecting, and a multiple-recording flapper 157 switches paths of double-sided recording and overlay recording. An ejecting roller 161 is placed by the paper-ejecting flapper 154, and it ejects the recording paper sheet, which is guided to the ejecting side by the paper-ejecting flapper 154, to outside of the main body 100.

When double-sided recording or overlay recording is operated, the paper-ejecting flapper 154 is moved up, and the recording paper from the ejecting roller 142 is guided to a lower conveying path 158. During this operation, in a case where the double-sided recording is operated, the recording paper is guided to a reversal path 155 by putting down the multiple-recording flapper 157 to the right, then conveyed to the lower conveying path 158 by a reversing roller 163 by putting down the multiple-recording flapper 157 to the left. Whereas, if the overlay recording is operated, the transferring paper sheet is directly guided to the lower conveying path 158 by putting down the multiple-recording flapper 157 to the left. The transferring paper sheet conveyed to the lower conveying path 158 is guided to the resistration roller 137 via a path 160 by a paper feed roller 159, then conveyed to the image forming unit once more.

In a case where the recording paper sheet is ejected upside down, the paper-ejecting flapper 154 is moved upward and the multiple-recording flapper 157 is put down to the right, thereby the transferring paper sheet is guided to the reversal path 155. After that, when the end of the transferring paper sheet passes a feeding roller 162, the recording paper sheet is ejected outside of the main body 100 by the reversing roller 163 and the ejecting roller 161.

Figure 2:
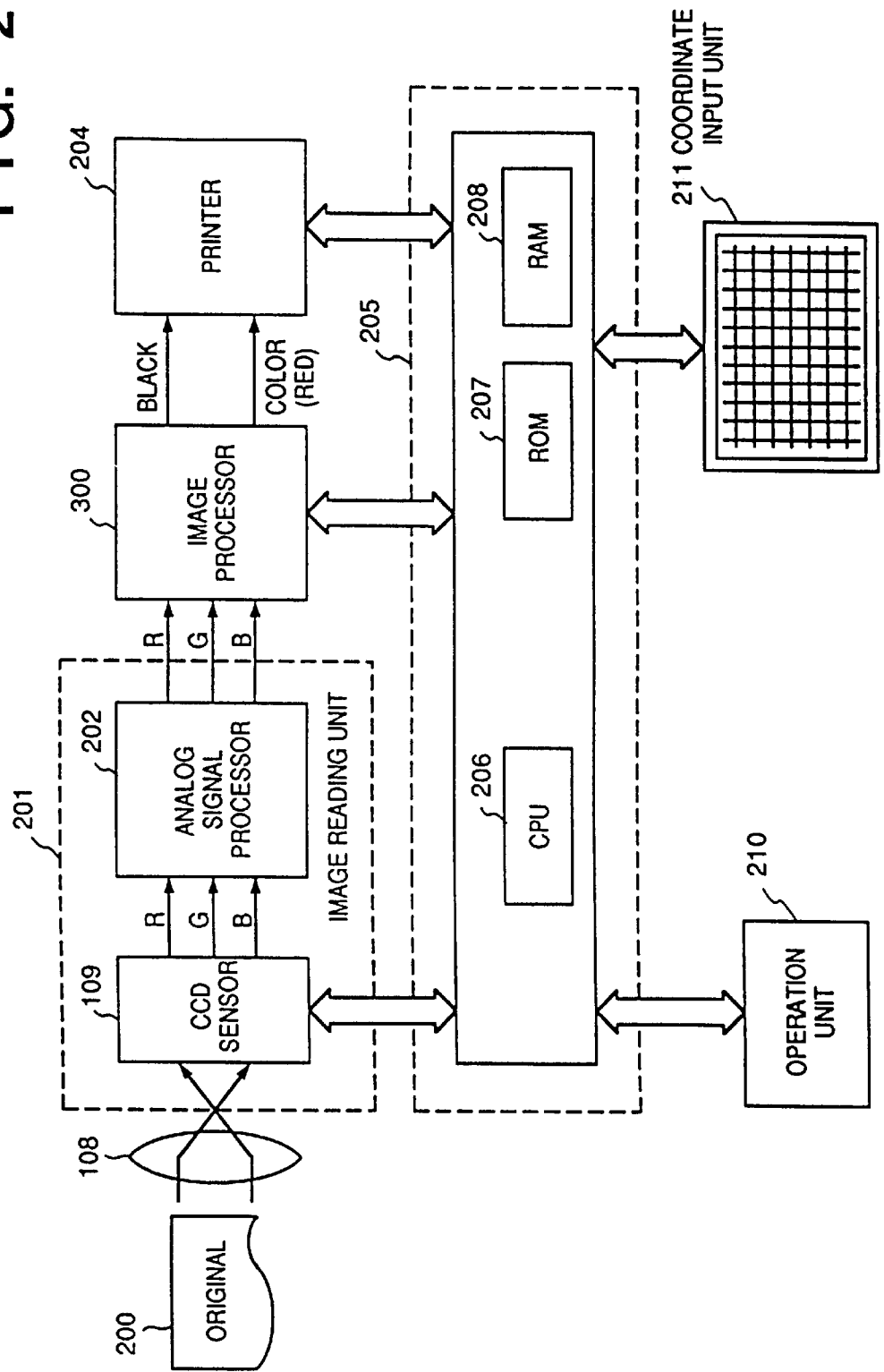
FIG. 2 is a block diagram showing a configuration of the image processing section of the first embodiment.

FIG. 2 is a block diagram showing a configuration of the image processing section of in the embodiment.

In FIG. 2, an image reading unit 201 in the present embodiment is constructed with the CCD sensor 109, an analog signal processor 202, and so on. An image of the original 200 which is focused on the CCD sensor 109 via the lens 108 is converted into analog signals of R (red), G (green), B (blue) by the CCD sensor 109, and inputted to an analog signal processor 202. The analog signal processor 202 subjects the R, G, and B color components to such processing as a sample-and-hold operation, dark-level correction, or the like, and then effects an analog-to-digital conversion (A/D conversion) so as to output digital color image signals.

In an image processor 300, correcting operations which are necessary at an image reading unit, such as shading correction, color correction, and γ-correction, and necessary image proceedings, such as smoothing process and edge reinforcement, are performed on the image signals inputted from the image reading unit 201, and the signals are outputted to a printer 204.

The printer 204 is constructed with the exposure controller 120, the black image forming unit 126, the color image forming unit 127, a conveying control unit of a recording paper sheet, etc., and records an image on the recording paper sheet based on an image signal inputted from the image processor 300.

Reference numeral 210 denotes an operation unit, and comprises a display and an input key for designating a number of copies to be printed and a copy mode. Reference numeral 211 indicates a coordinate input unit for inputting a desired area of the original image in coordinate notation.

Further, a controller 205 is constructed with CPU 206, ROM 207, RAM 208, etc. The controller 205 controls units, such as the image reading unit 201, the image processor 300, the printer 204, the operation unit 210, and coordinate input unit 211, further controls a copy sequence generally in the first embodiment as well as performs color discrimination and determines the color for separation and color for output, by executing a program stored in the ROM 207 or the like.

Figure 3:
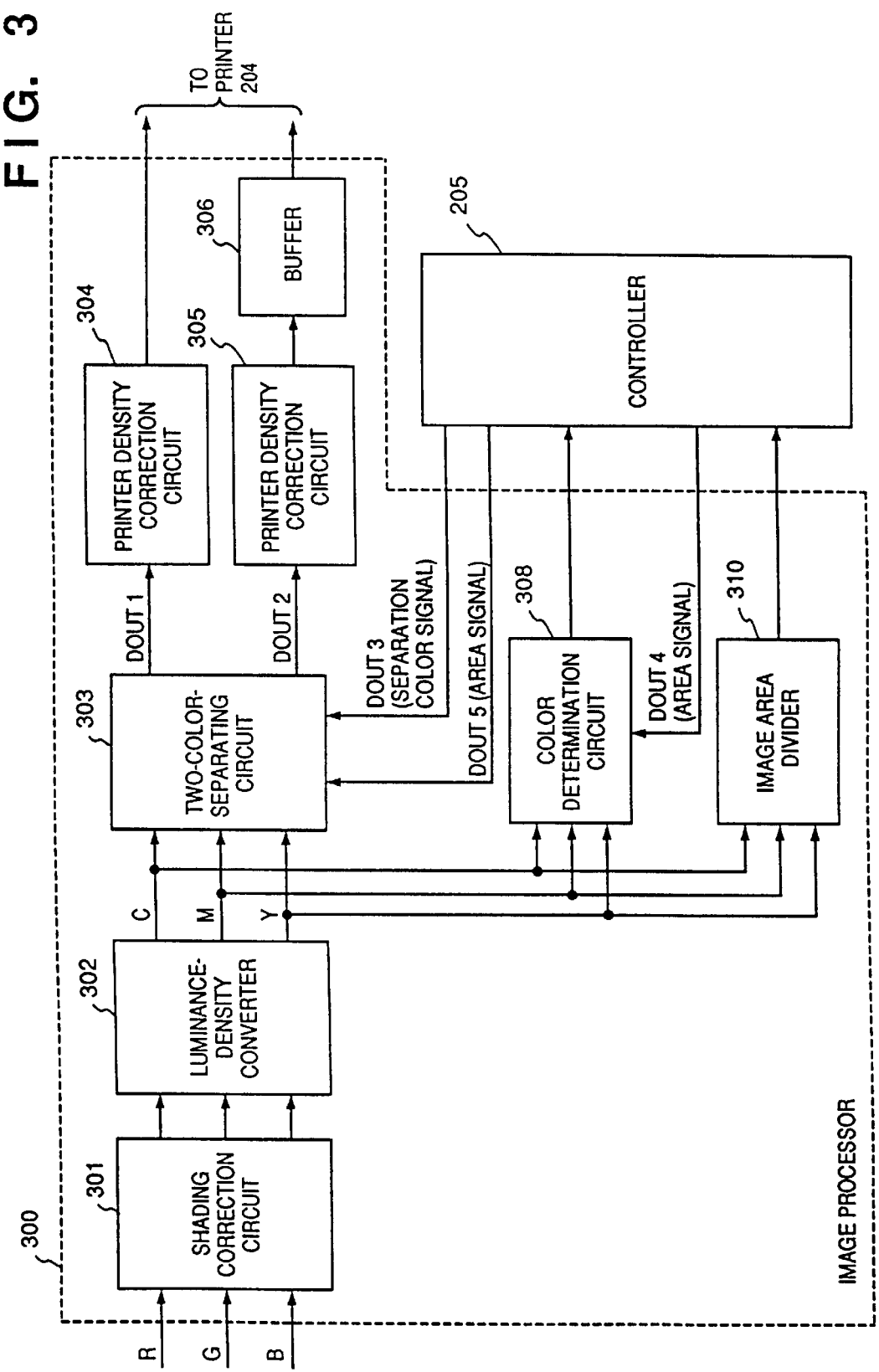
FIG. 3 is a block diagram illustrating the detailed configuration of an image processor shown in FIG. 2.

FIG. 3 is a block diagram of the detailed configuration of the image processor 300.

An shading correction circuit 301 corrects unevenness, which is a characteristic of a sensor used for reading an original image, and corrects light division which is a characteristic of a lamp used for illuminating the original on eight-bit digital image signals inputted from the image reading unit 201.

302 indicates a luminance-density converter which converts image signals inputted from the shading correction circuit 301 from a RGB luminance signal to a CMY density signal.

Two-color-separating circuit 303 generates separated image data of one of these following sets, "black and red", "black and green", and "black and blue" based on a separation color signal DOUT3 and an area signal DOUT5, which will be explained later, from the CMY image signal inputted from the luminance-density converter 302.

Figure 4:
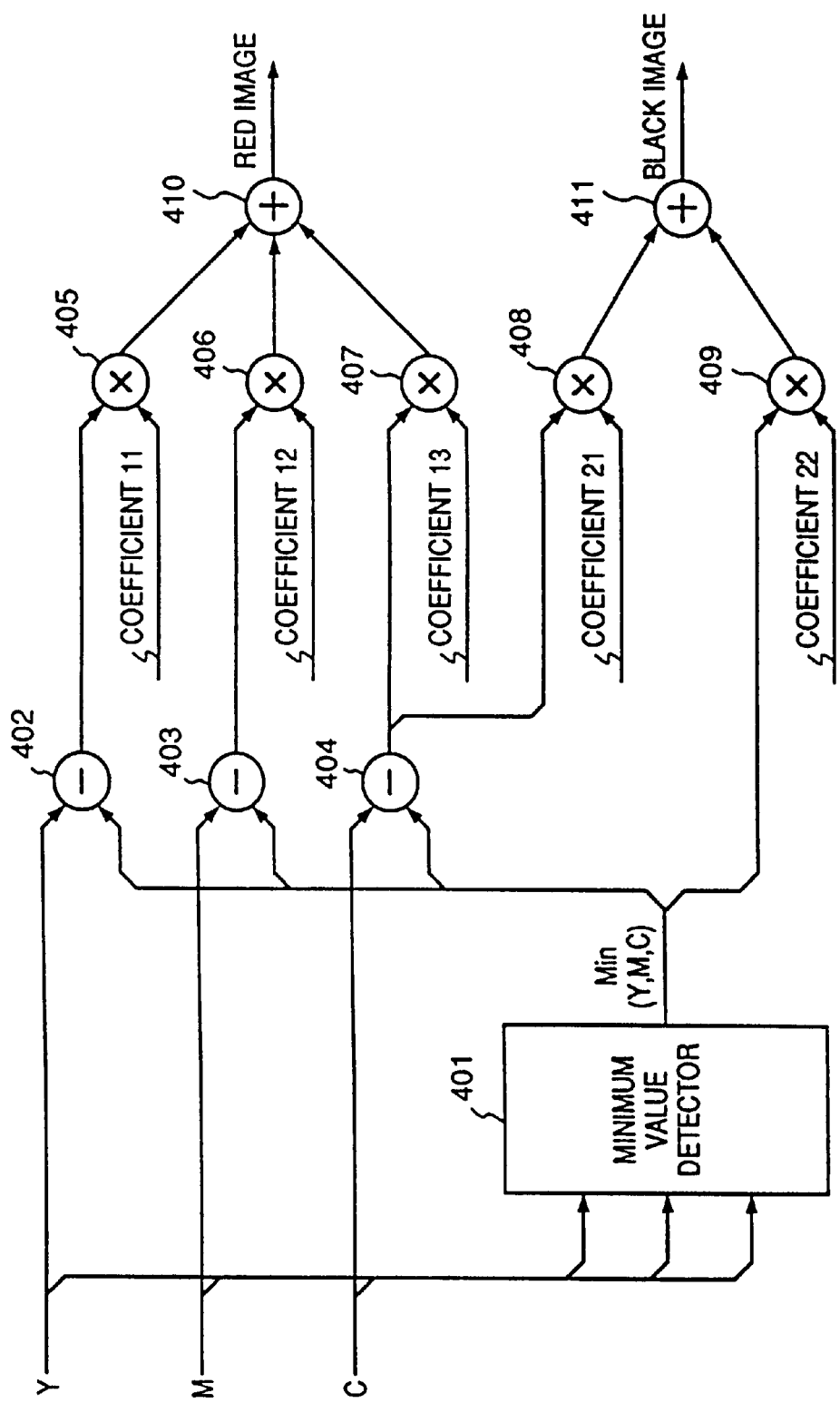
FIG. 4 is a block diagram illustrating the detailed configuration of a two-color separating circuit shown in FIG. 3.

FIG. 4 is a block diagram illustrating the detailed configuration of the two-color-separating circuit 303.

The CMY image signal is first inputted to a minimum value detector 401. The minimum value detector 401 detects the signal which has the smallest value of the three kinds of image signals. In other words, it detects the least dense signal.

Subtracters 402, 403, and 404 subtract the detection result, Min(Y, M, C), detected by the minimum value detector 401 from the inputted Y signal, M signal, and C signal.

When a red image is generated, the differences by the subtractor 402, 403 and 404, are multiplied by the pre-calculated coefficients (coefficient 11, coefficient 12, and coefficient 13) at multipliers 405, 406, and 407. The three products are added up at an adder 410, then the sum is outputted as red image data. Image data of an arbitrary color can be generated by changing coefficients.

In a case where a black image is generated, a difference, C-Min(C,M,Y), calculated by the subtractor 404 is multiplied by a coefficient 21 to obtain a product by a multiplier 408, then multiplying the minimum value, Min(C,M,Y), by a coefficient 22 at the multiplier 409. An adder 411 adds the products from the multipliers 408 and 409, then the sum is outputted as black image data.

In short, separated image data is generated by using following operations. Each coefficient included in equations written below is calculated in advance To obtain the black and red image data:

red image =coefficient 11×{Y−Min(Y,M,C)}+coefficient 12×{M−Min(Y,M,C)}+coefficient 13×{C−Min(Y,M,C)} black image=coefficient 22×Min(Y,M,C)+coefficient 21×{C−Min(Y,M,C)}

To obtain the black and green image data:

green image=coefficient 31×{Y−Min(Y,M,C)}+coefficient=×{M−Min(Y,M,C)}+coefficient 33×{C−Min(Y,M,C)} black image=coefficient 42×Min(Y,M,C)+coefficient 41×{C−Min(Y,M,C)}

To obtain the black and blue image data:

blue image=coefficient 51×{Y−Min(Y,M,C)}+coefficient 52×{M−Min(Y,M,C)}+coefficient 53×{C−Min(Y,M,C)} black image=coefficient 62×Min(Y,M,C)+coefficient 61×{C−Min(Y,M,C)} where "Min" is a function which gives the minimum value of the values inside of the parenthesis.

Next, a method to determine a coefficient for generating the red image will be described.

Figure 5:
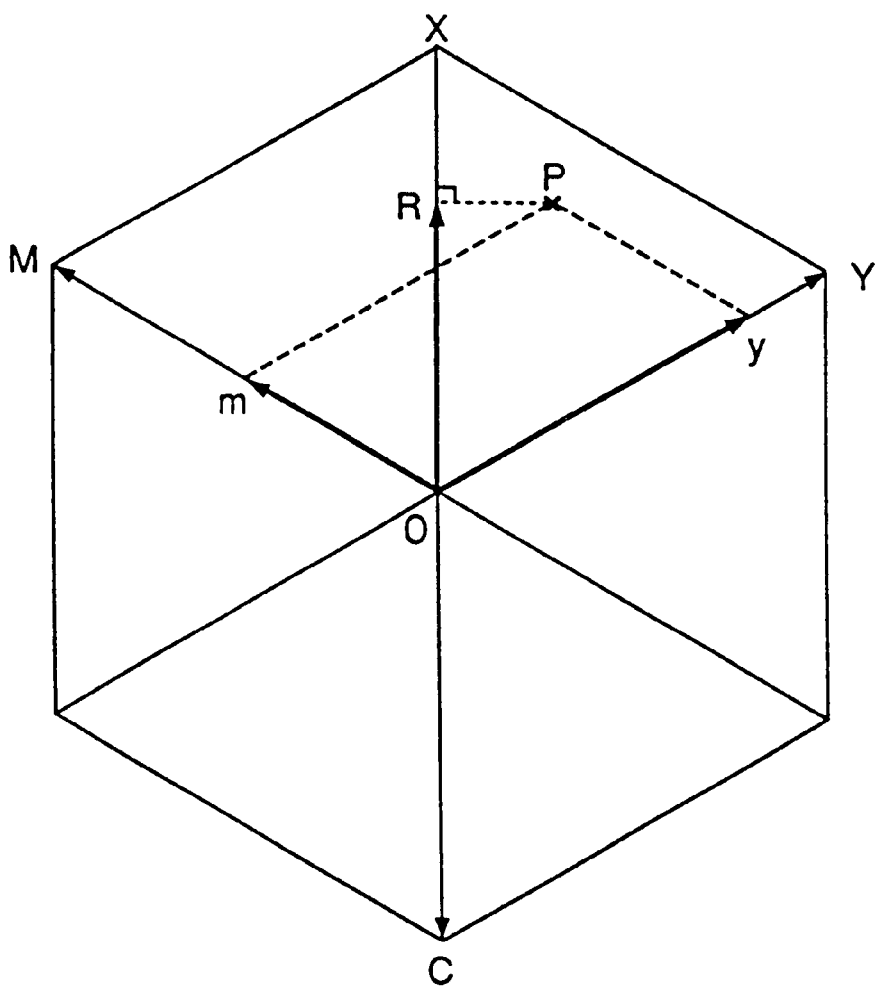
FIG. 5 is an explanatory view showing a method to determine a coefficient for generating a red image.

FIG. 5 is an explanatory view showing a YMC color space, and the each density axis makes an angle of 120 degree with the other axes. At the point where the three axes intersect, namely an origin, the value is 0, and the value of density increases as a point recedes from the origin radially.

The image signal which is removed with the non-color component by the aforesaid process is explained as a point in the color space by using two axes out of three. For example, if an image signal described as (C,M,Y)=(c0,m0,y0) becomes (0,m,y) after the aforesaid process is performed on the signal, then it is described as a point P in the color space.

Assume that the axis X for the desired red component is arranged in the synthesis direction of M and Y of the color space, then an equation, $$R=m/2+y/2$$

is obtained, where R is the red component data, if the point P is plotted on the axis X, and both of the coefficients 11 and 12 are 1/2, and the coefficient 13 is zero. Note that when m=0 and c>y, or y=0 and c>m are satisfied, then R<0, however, the value of R is set as 0 in this case so that density data of negative value will not be generated. A proper normalization, such as linear or non-linear process which converts the R data into R' characterized by $0 \leq R' \leq$ (Maximum value) can be also applied to avoid negative density data being generated.

The red image data is generated by obtaining the R data for each pixel, for instance, of an inputted image signal, as described above.

Next, an example of generating the red image data by using an axis X' which is rotated by the arbitrary degree $\vartheta$ ($-60° \leq \vartheta \leq +60°$) is described below.

Figure 6:
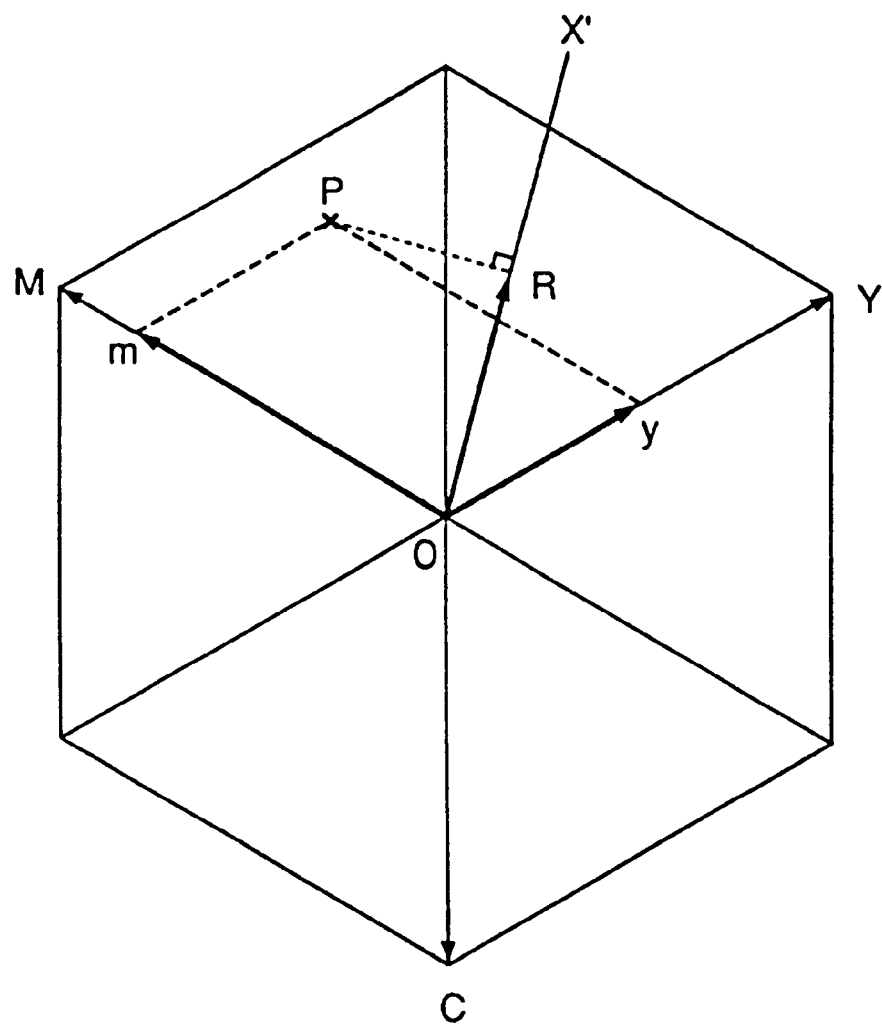
FIG. 6 is an explanatory view showing a method to determine a coefficient for generating a red image.

In a color space illustrated in FIG. 6, the desired red component axis is arranged in the axis X' direction and the point P(0,m,y) is plotted on the axis X'. Then an equation, $$R=cos(60°+\vartheta)m+cos(60°\vartheta)y$$

is obtained where R is the red component data. In this case, the coefficient 11 is cos(60°−$\vartheta$), the coefficient 12 is cos(60°+$\vartheta$), and the coefficient 13 is zero. If the obtained R has a negative value, it must be changed to a non-negative value, such as R 0, or by proper normalization as described above.

Next, an example for generating green image data is described below.

Figure 7:
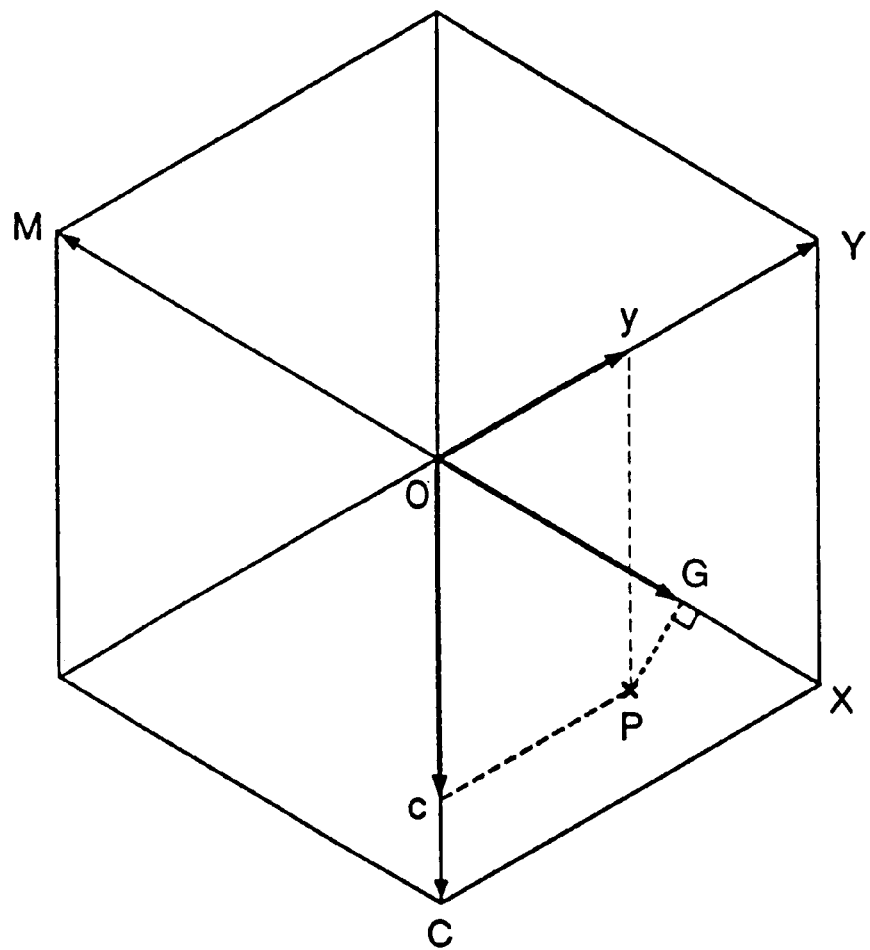
FIG. 7 is an explanatory view showing a method to determine a coefficient for generating a green image.

In a color space illustrated in FIG. 7, the axis X for the desired green component is arranged in the synthesis direction of Y and C in the color space. Then an equation, $$G=c/2+y/2$$

is obtained, where G is the green component data, if the point P(c,0,y) is plotted on the axis X. In this case, both of the coefficients 31 and 33 are 1/2, and the coefficient 32 is zero. This is equivalent to the case where the previous $\vartheta$ is fixed to +120°. If the obtained G has a negative value, it must be changed to a non-negative value, such as G=0, or by proper normalization as described above.

In FIG. 3, the separation color signal DOUT3 and the area signal DOUT5 which are outputted from the controller 205 are stored in a table in the two-color-separating circuit 303 before an image signal is processed. This table is referred to during an image forming process, and used to change the coefficients in dependence upon the synchronizing signal of the image signal.

According to the color separating method in this embodiment, a full color image expressed by RGB or CMY can be expressed by two color components. In other words, the angle from the axis X corresponds to the hue difference from a color to be separated.

In a printer density correction circuit 304, density correction, for output to the printer 204, is performed on a black image signal DOUT1 which is outputted from the two-color-separating circuit 303, then the signal is transmitted to the printer 204. Similarly, in a printer density correction circuit 305, density correction, for output to the printer 204, is performed on a color image signal DOUT2, and after the color image signal DOUT2 is held at a buffer 306 for a predetermined time, transmitted to the printer 204.

An image area divider 310 divides a photograph area included in the inputted CMY signal by known dividing method, and outputs an area signal of the photograph area. For example, the photograph area can be divided in accordance with an edge amount, density change inside of the block, a number of changing points inside of the block, and so on. The area signal is sent to the controller 205.

Reference numeral 308 denotes a color determination circuit which stores the inputted page CMY image signal an image in a page memory placed inside of the color determination circuit 308, and generates each image data of red, green, and blue inside the image area designated by an area signal DOUT4 by the similar operation as the two-color-separating circuit 303 does. Each image data is sent to the controller 205, and there, the separation color signal of one of the colors, red, green, and blue, is generated depending upon the frequency comparison result.

The controller 205 generates the color separation signal DOUT3 and the area signal DOUT5, then sends them to the two-color-separating circuit 303 by using the area signal and a color separation signal sent from the image area divider 310 and the color determination circuit 308, respectively.

Figure 8:
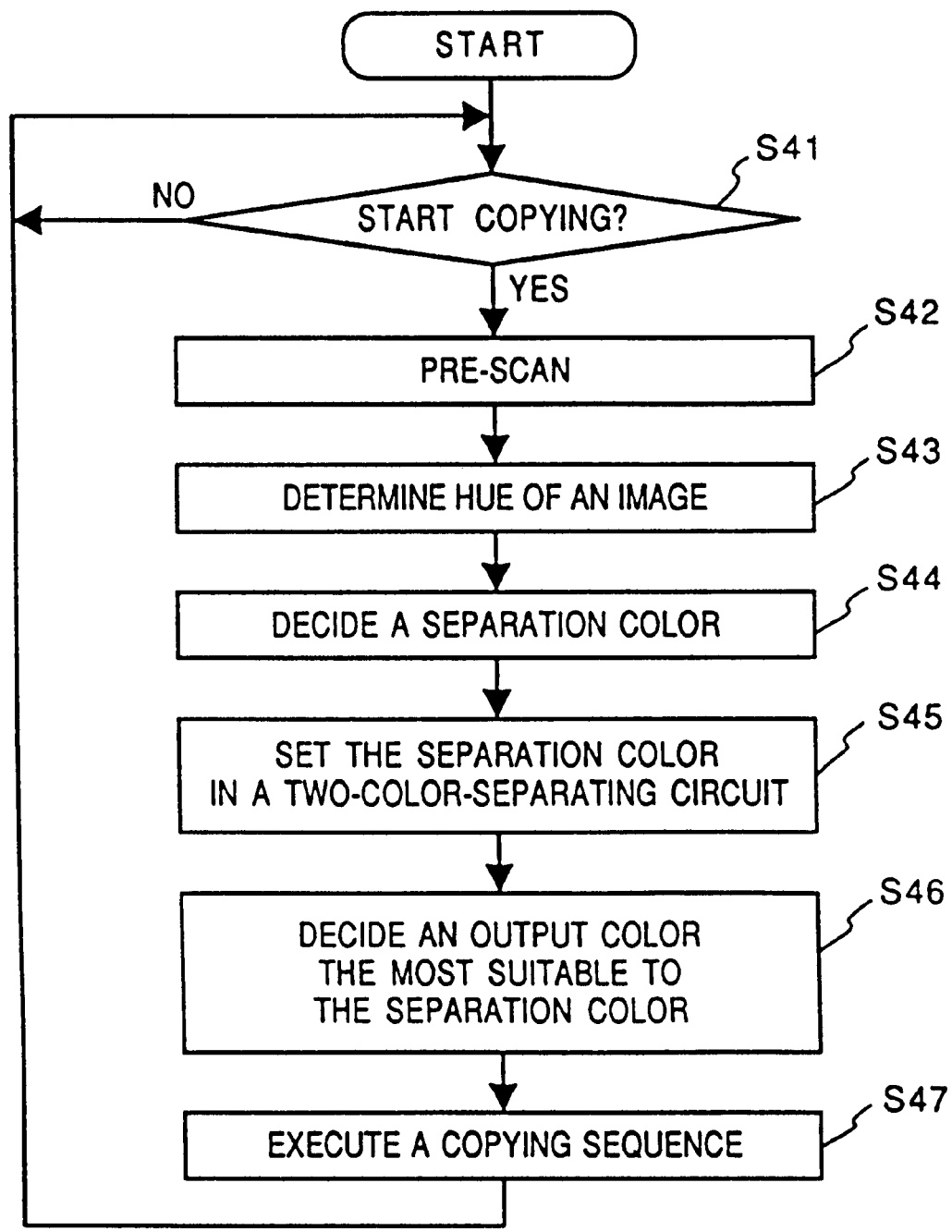
FIG. 8 is a flowchart illustrating process of an image forming.

FIG. 8 is a flowchart showing the image forming process, executed by the controller 205 of the present embodiment.

When the operation unit 210 designates an instruction, such as 'start copying', at step S41, the original 200 is pre-scanned at step S42. The image information on the original 200 is stored in the color determination circuit 308 via the image reader 201.

Successively at step S43, the image data of each color is generated by the color determination circuit 308 by designating the entire original image with the area signal DOUT4, then hue of the original image is discriminated. At step S44, the separation color is decided on the basis of the separation color determination information which is stored in the ROM 207 or the RAM 208 in advance.

Then at step S45, the separation color signal DOUT3 which designates the decided separation color and the area signal DOUT5 which designates that the entire original image is transmitted to the two-color-separating circuit 303. Those signals are placed in a table inside of the two-color-separating circuit 303.

Further at step S46, an output color is decided in order to output the image which is separated in accordance with the decided separation color on the basis of the output color decision information which is stored in the ROM 207 or the RAM 208 in advance. The color to be outputted is desirably set to the color which has the best chromaticity in the same color family, red for reddish colors, for instance. However, the output color can be set to an arbitrary color, needless to say. Then the developer of the color image forming unit 127 is selected based on the decided output color.

Next at step S47, a series of the copying sequence is executed and the image forming is completed in dependence upon the decided separation color and the output color, then the apparatus moves to a waiting state for another instruction after the process moves back to step S41.

According to the present embodiment as described above, since the separation color is decided based on the hue of the detected original image, the separation color can be decided in correspondence with the input image, further the output color corresponding to the decided separation color can be decided.

[Second Embodiment]

An image processing apparatus according to the second embodiment is described. Note that, in the second embodiment, the same or similar devices as in the first embodiment have the same reference numerals, and the explanations on those devices are omitted.

Figure 9:
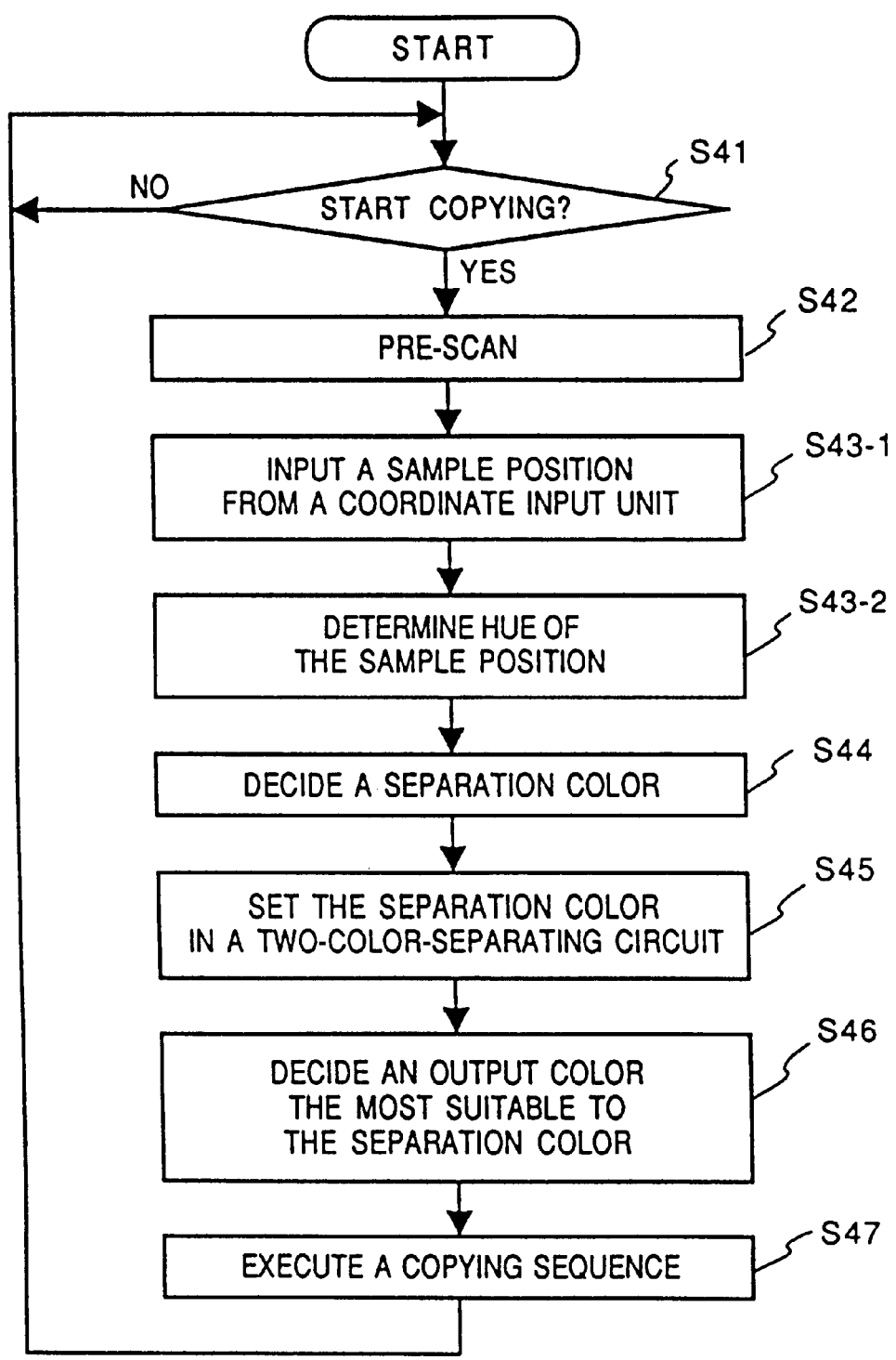
FIG. 9 is a flowchart illustrating process of an image forming according to a second embodiment.

FIG. 9 is a flowchart showing the image forming process, and executed by the controller 205. The same or similar processes as described in the first embodiment with reference to FIG. 8 have the same reference numerals, and the explanation on those steps are omitted.

At step S43-1, a user inputs a sample color position where the determination of hue of the original image is performed by using the coordinate input unit 211. The position information is inputted to the controller 205.

Then at step S43-2, by designating an area, which is small enough to correspond to the designated sample color position in accordance with the area signal DOUT4, the image data of the each color is obtained from the color determination circuit, then hue determination of the original image is performed. The separation color is decided in accordance with the determination result at step S44.

The other processes are the same as the ones in the first embodiment, thus the explanations on those processes are omitted.

According to the present embodiment as described above, the separation color of the inputted image can be decided in accordance with the user's need by the sample color position for deciding the separation color being designated by a user on the original, further the output color corresponding to the decided separation color can be also decided.

[Third Embodiment]

An image processing apparatus according to the third embodiment of the present invention will be explained below. Note that, in the third embodiment, the same or similar devices as in the first embodiment have the same reference numerals, and the explanations on those devices are omitted.

Figure 10:
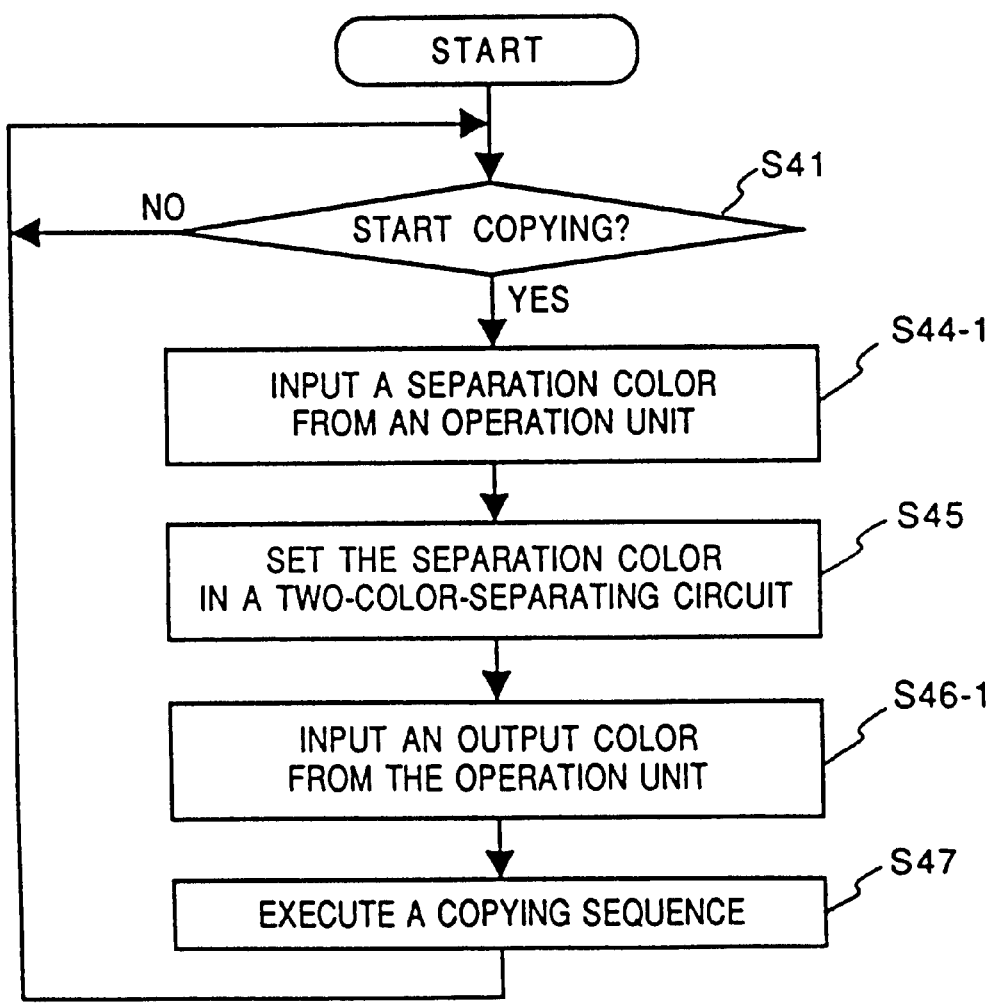
FIG. 10 is a flowchart illustrating process of an image forming according to a third embodiment.

FIG. 10 is a flowchart showing the image forming process, and executed by the controller 205. The same or similar processes as described in the first embodiment with reference to FIG. 8 have the same reference numerals, and the explanation on those steps are omitted.

At step S44-1, a user inputs a desired separation color by using the operation unit 210.

Then at step S45, the separation color signal DOUT3 which designates the decided separation color and the area signal DOUT5 which designates the entire original image are sent to the two-color-separating circuit 303. Those signals are set in the table inside the two-color-separating circuit 303.

Successively at step S46-1, the user inputs the desired output color by using the operation unit 210. The developer of the color image forming unit 127 is selected in correspondence with the designated output color.

Then at step 47, after an image is formed by executing the copying sequence based on the decided separation color and the decided output color, finally the program moves back to step S41, and the apparatus becomes a waiting state for another instruction.

According to the present embodiment as described above, the user is able to designate the desired separation color and the desired output color.

[Fourth Embodiment]

An image processing apparatus according to the fourth embodiment of the present invention will be explained below. Note that, in the fourth embodiment, the same or similar devices as in the first embodiment have the same reference numerals, and the explanations on those devices are omitted.

Figure 11:
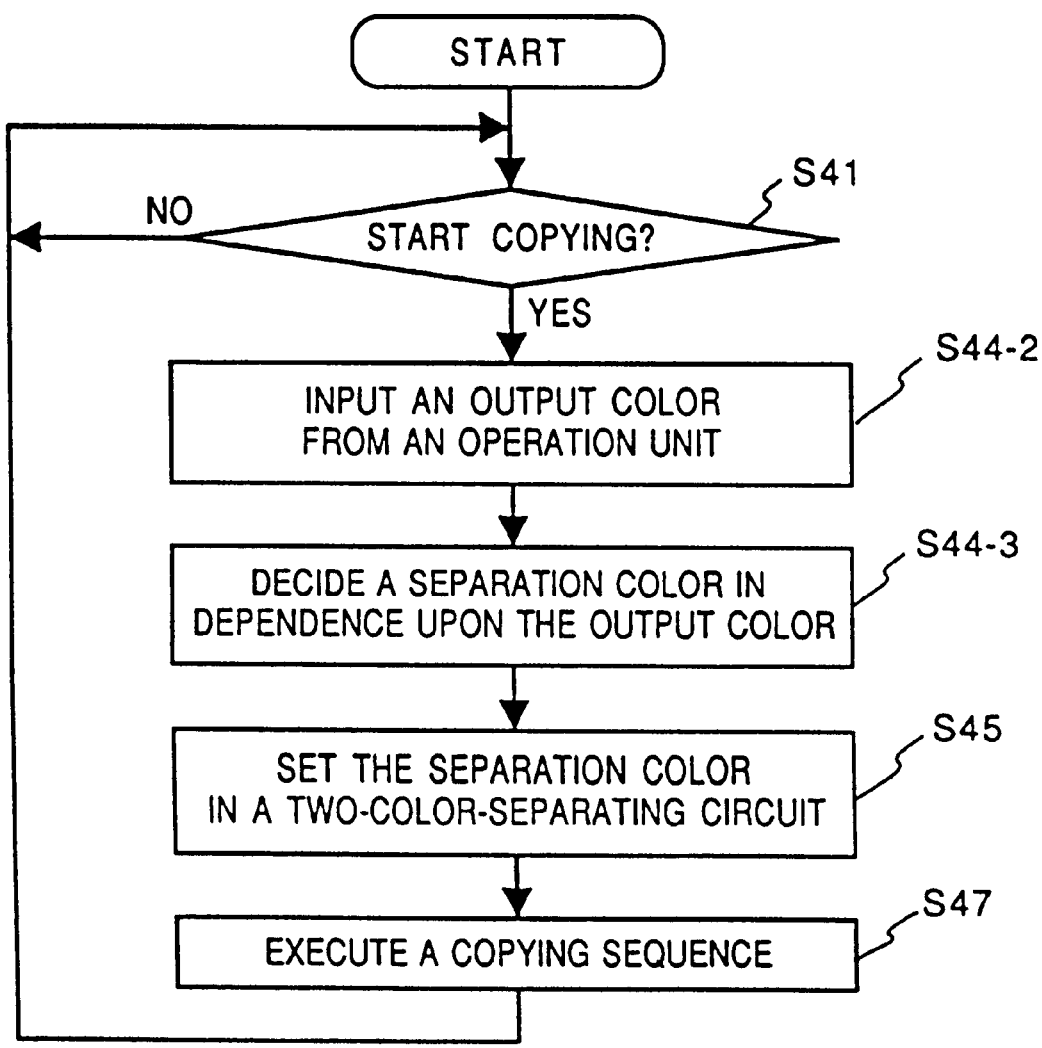
FIG. 11 is a flowchart illustrating process of an image forming according to a fourth embodiment.

FIG. 11 is a flowchart showing the image forming process, and executed by the controller 205. The same or similar processes as described in the first embodiment with reference to FIG. 8 have the same reference numerals, and the explanation on those steps are omitted.

At step S44-2, a user inputs a desired output color by using the operation unit 210. The developer of the color image forming unit 127 is selected in correspondence with the designated output color.

Next at step S44-3, a separation color is decided on the basis of the separation color decision information which is stored in the ROM 207 or the RAM 208 in advance for a case where an image is formed with the designated output color. The separation color to be designated is desirably set to the color which is in the same color family, a color in red family if the output color is red, for instance. However, the separation color can be set to an arbitrary color in accordance with the separation color decision information, needless to say.

Then at step S45, the separation color signal DOUT3 which designates the decided separation color and the area signal DOUT5 which designates the entire original image are sent to the two-color-separating circuit 303. Those signals are set in the table inside the two-color-separating circuit 303.

Then at step 47, after an image is formed by executing the copying sequence based on the decided separation color and the decided output color, the program moves back to step S41, and the apparatus becomes a waiting state for another instruction.

According to the fourth embodiment as described above, the separation color corresponding to the designated output color is decided when the user designates the desired output color.

[Fifth Embodiment]

An image processing apparatus according to the fifth embodiment of the present invention will be explained below. Note that, in the fifth embodiment, the same or similar devices as in the first embodiment have the same reference numerals, and the explanations on those devices are omitted.

Figure 12:
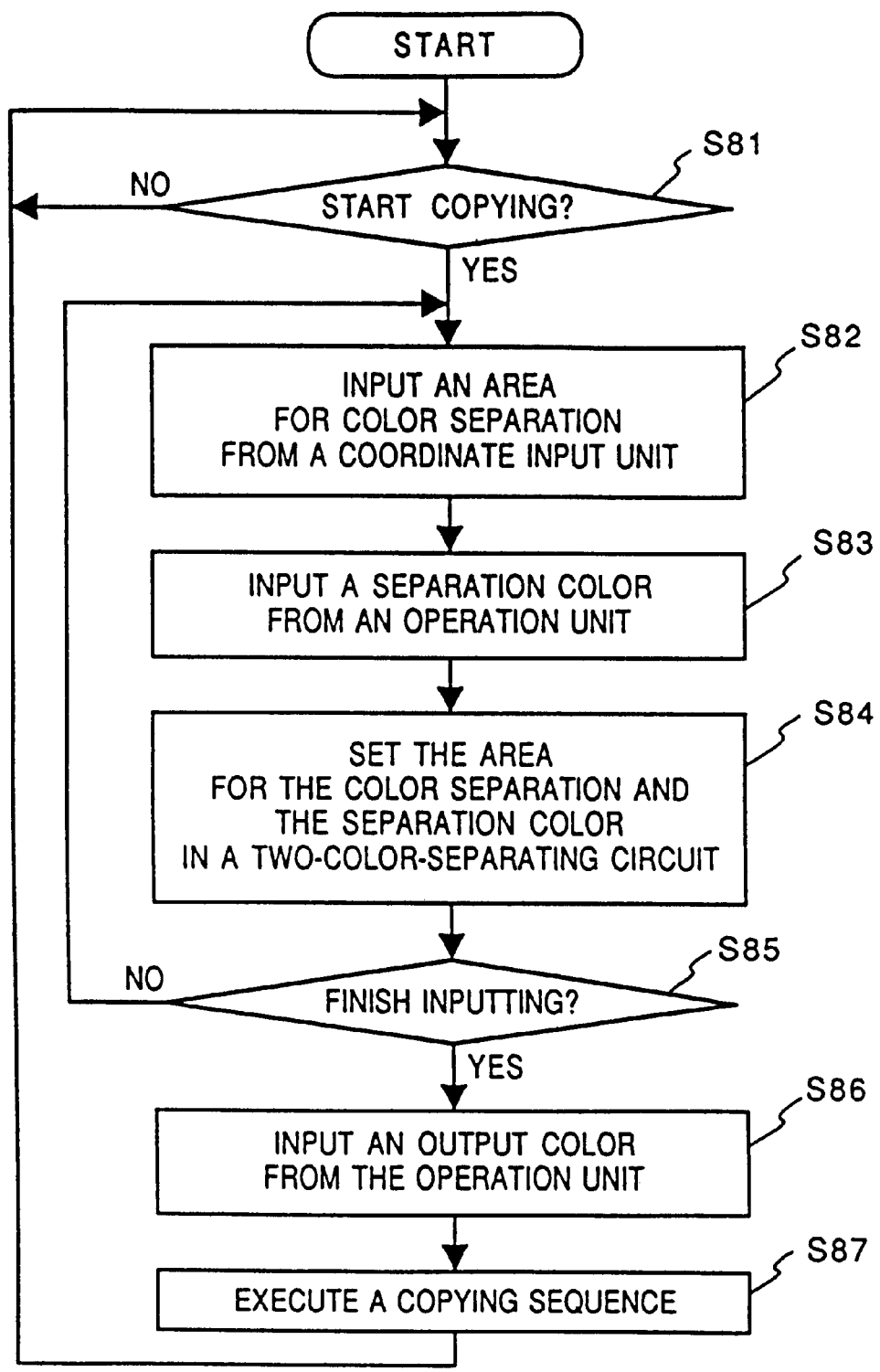
FIG. 12 is a flowchart illustrating process of an image forming according to a fifth embodiment.

FIG. 12 is a flowchart showing the image forming process in the fifth embodiment, and executed by the controller 205.

At step S81, a process is held at the operation unit 210 until an instruction, such as 'start copying', is issued, and when to start copying is instructed, the process proceeds to step S82.

A user inputs an area for the color separation by using the coordinated input unit 211 at step S82, then inputs the desired separation color by using the operation unit 210 at step S83.

Successively at step S84, the separation color signal DOUT3 which designates the decided separation color and the area signal DOUT5 which designates the area for color separation are sent to the two-color-separating circuit 303. These signals are set in the table inside the two-color-separating circuit 303.

Further at step S85, whether or not the user has instructed the end of inputting the area for the color separation and its separation color is determined. If so, the process proceeds to step S86, and if not, the process moves back to step S82.

At step S86, the user inputs the desired output color by using the operation unit 210. Note that the developer of the color image forming unit 127 is selected in accordance with the designated output color.

Next at step S87, the separation colors are changed so as to correspond to each area for the color separation in accordance with the table in the two-color-separating circuit. After the copying sequence is executed and an image is formed based on the designated output color, then the apparatus moves to a waiting state for another instruction after the process moves back to step S81.

According to the fifth embodiment as described above, the desired area for the color separation, the desired separation color, and output color can be designated.

[Sixth Embodiment]

An image processing apparatus according to the sixth embodiment of the present invention will be explained below. Note that, in the sixth embodiment, the same or similar devices as in the first embodiment have the same reference numerals, and the explanations on those devices are omitted.

Figure 13:
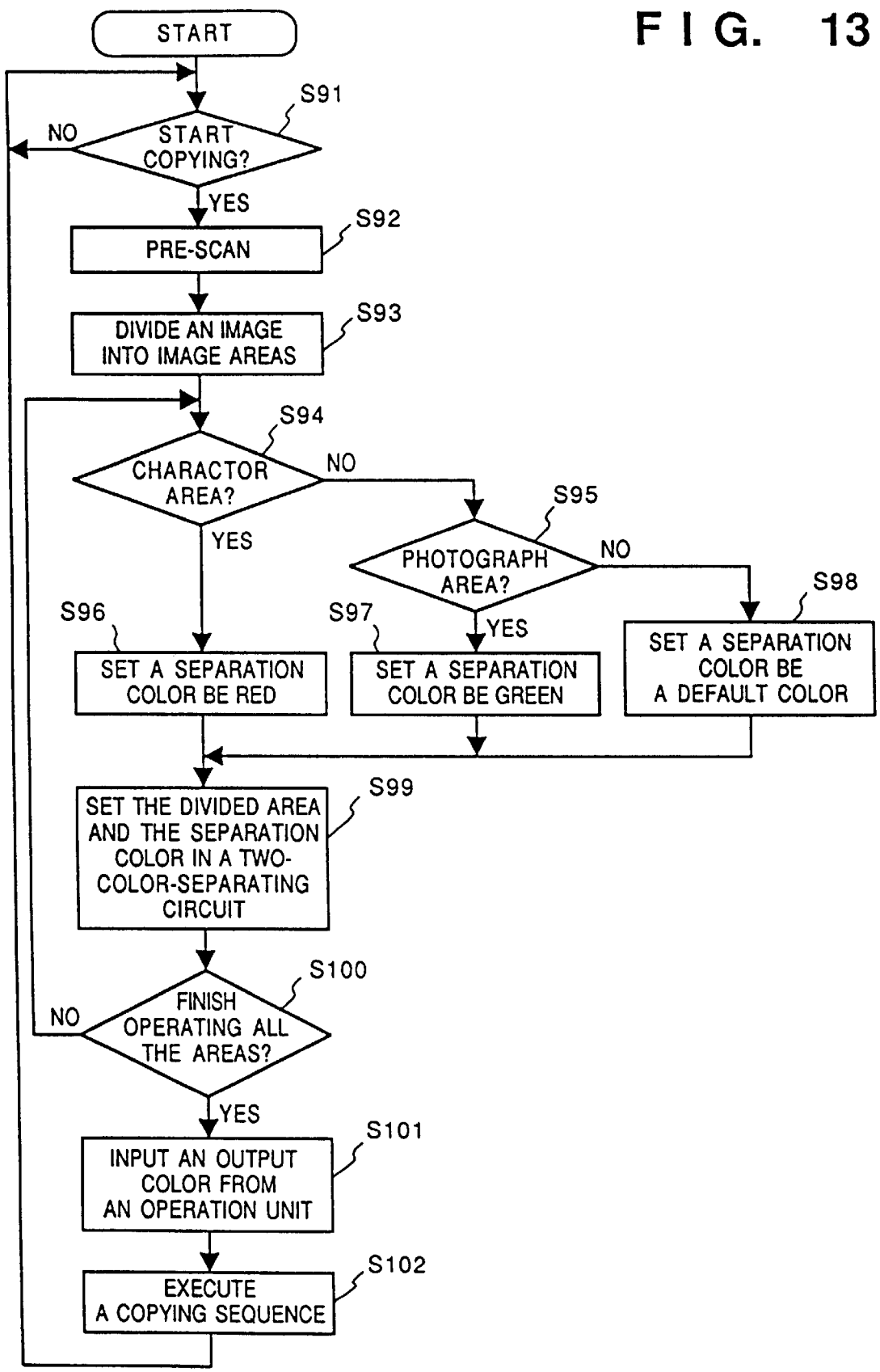
FIG. 13 is a flowchart illustrating process of an image forming according to a sixth embodiment.

FIG. 13 is a flowchart showing the image forming process in the sixth embodiment, and executed by the controller 205.

When an instruction, such as 'start copying', is issued by the operation unit 210 at step S91, the original 200 is pre-scanned, and image information on the original is stored inside of the color determination circuit 308 at step S92.

Then at step S93, the pre-scanned image, which is stored inside of the color determination circuit 308, is divided into image areas by the image area divider 310, thus divided area information is obtained.

Successively at steps S94 and S95, depending upon a kind of divided area, the process branches. In other words, if the area is a character area, then the process proceeds to step S96, and if the area is a photograph area, then the process proceeds to step S97, whereas if the area is neither one of above, then the process moves to step S98.

In a case where the area is the character area, the separation color of the area is designated as red at step S96, whereas in a case where the area is the photograph area, the separation color is designated as green at step S97. In a case where the area is neither the character area nor the photograph area, the separation color of the area is set default at step S98, then the separation color signal DOUT3 indicating the decided separation color and the area signal DOUT5 indicating the separated area are sent to the two-color-separating circuit 303. Those signals are set in the table inside of the two-color-separating circuit 303.

Next at step S100, whether or not the table has been set for the entire area is determined. If it has, the process proceeds to step S101, whereas if not, the process proceeds to step S94, and processes S94 to S99 are repeated.

When the table has been set for the entire area, a user input/the desired output color by using the operation unit 210 at step S101. Note that the developer of the color image forming unit 127 is selected in accordance with the output color.

At step S102, the separation colors are changed corresponding to each area in dependence upon the table. After the copying sequence is executed to form an image, the process moves back to step S101, and the apparatus moves to a waiting status for another instruction.

Figure 14:
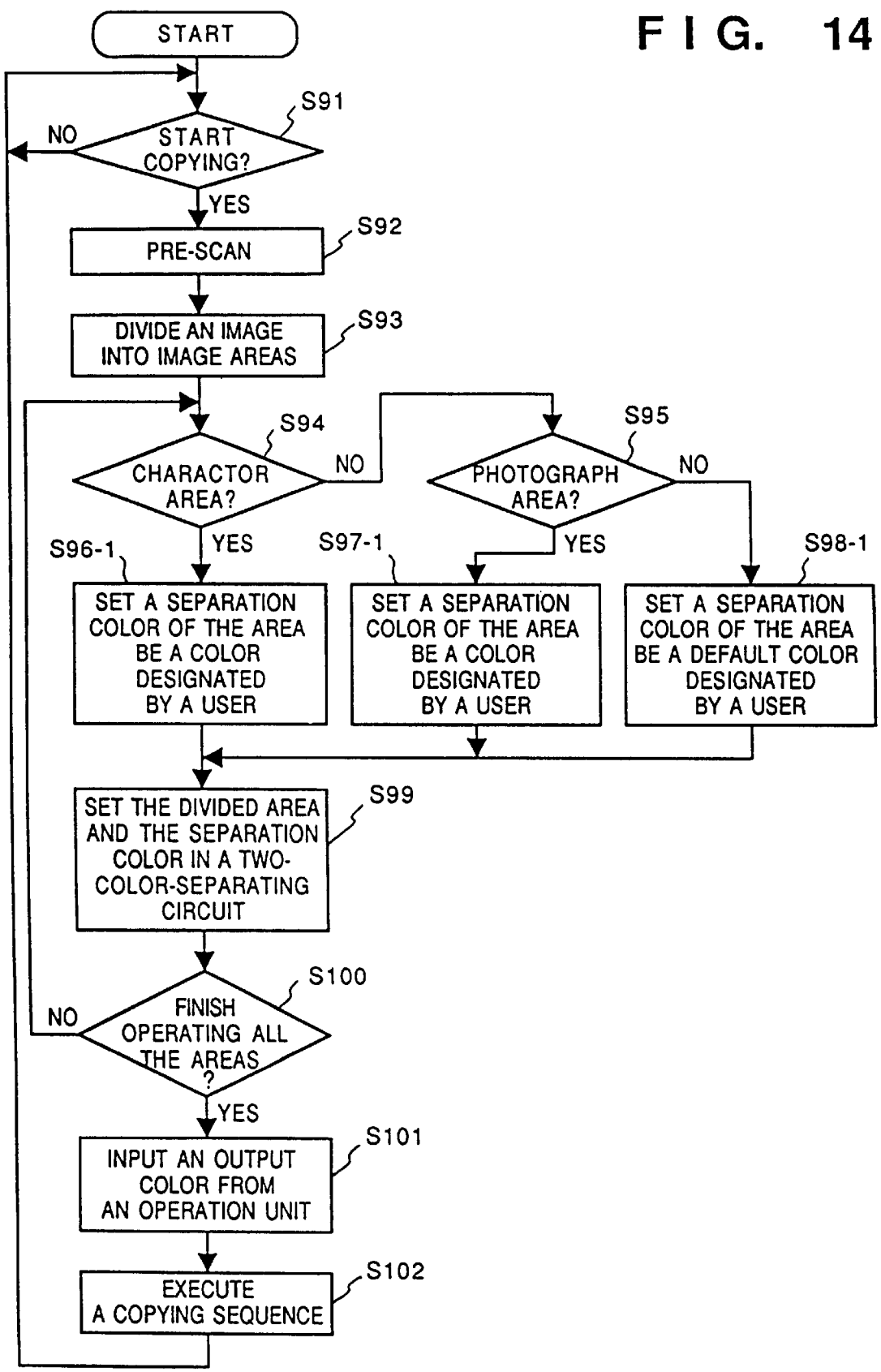
FIG. 14 is a flowchart illustrating process of an image forming in a case where a user sets colors for separation according to the sixth embodiment.

It should be noted that in the aforesaid explanation, the separation color of the character area is red in consideration of the original being marked with red color, and the separation color of the photograph area is green in consideration of the original photographing a view of nature containing large green area. However, the present embodiment is not limited to these two colors, and including the default separation color, the separation color can be arbitrarily set from the operation unit 210 or the like in advance as shown at steps S96-1, S97-1, and S98-1 in FIG. 14. In the same figure, the same or similar steps to the ones in FIG. 13 according to the sixth embodiment have the same reference numerals.

Figure 15:
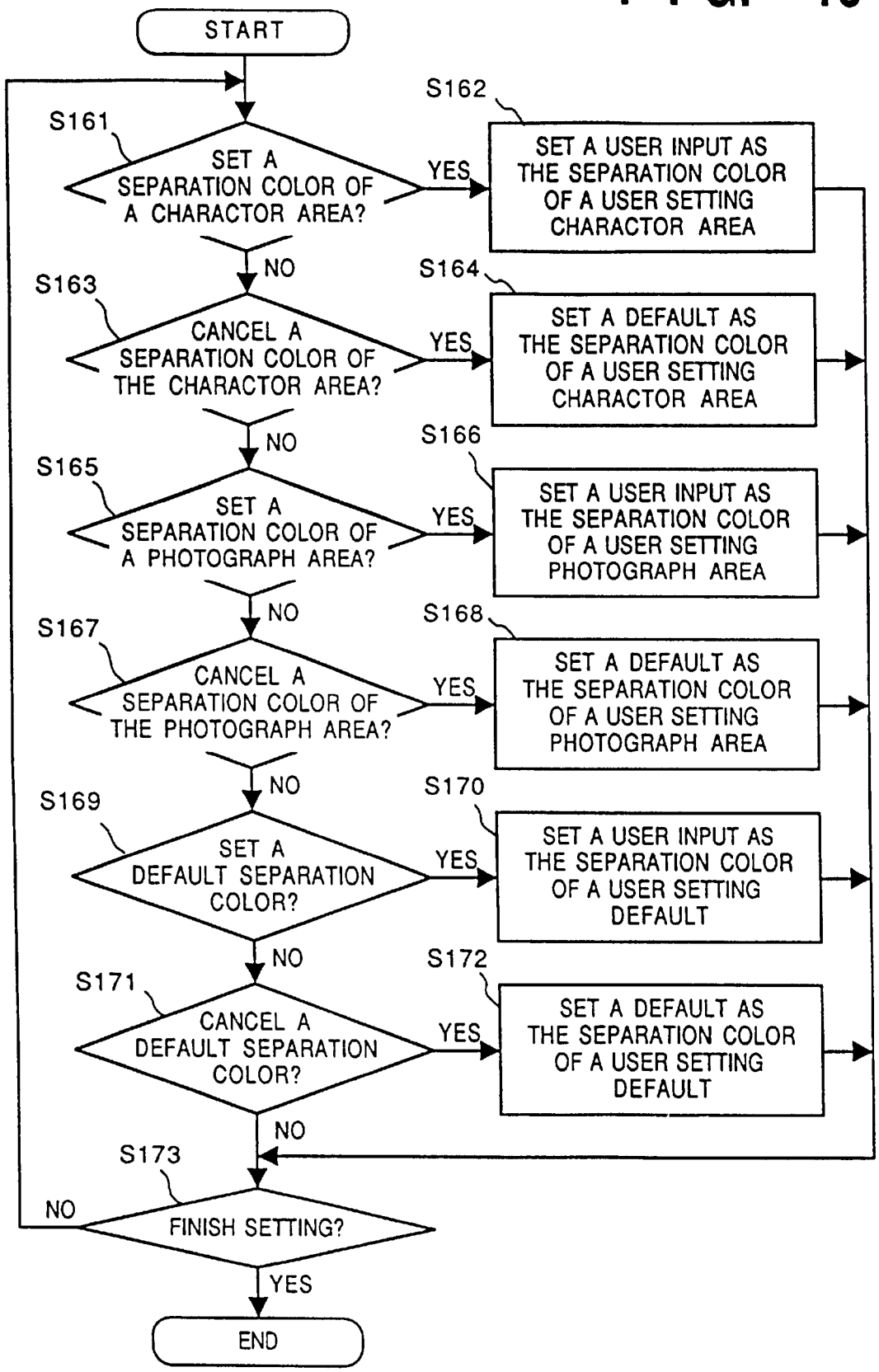
FIG. 15 is a flowchart illustrating process that the user sets the colors for separation according to the sixth embodiment.

FIG. 15 shows a flowchart showing the process at which a user sets the separation color. According to FIG. 15, when a user designates a user separation color setting mode from the operation unit 210, the process is operated by the controller 205.

At step S161, whether or not the instruction by the user indicates the setting of the separation color in the character area is determined, if so, the color which is designated by the user (a user setting character area separation color) is stored in the RAM 208 at step 162, then process proceeds to step S173.

If the instruction does not indicate the setting of the separation color of the character area, then whether or not the instruction indicates to cancel the separation color in the character area is determined. If so, a character area separation color, which is a default stored in the ROM 207, is stored in the RAM 208 as the user setting character area separation color at step S164, then the process proceeds to step S173.

In a case where the instruction does not indicate the cancellation of the separation color in the character area, whether or not the instruction indicates the setting of the separation color in the photograph area is determined. If so, a color which is designated by the user at step S166 (the user setting photograph area separation color) is stored in the RAM 208, then the process proceeds to step S173.

In a case where the instruction does not indicate the setting of the separation color in the photograph area, whether or not the instruction indicates the cancellation of the separation color in the photograph area is determined. If so, the photograph area separation color, which is a default stored in the ROM 207, is stored in the RAM 208 as the user setting photograph area separation color at step S168, then the process proceeds to step S173.

In a case where the instruction does not indicate the cancellation of the separation color in the photograph area, whether or not the instruction indicates the setting of the default separation color is determined at step S169. If so, a color designated by the user (the user setting default separation color) is stored in the RAM 208 at step S170, then the process proceeds to step S173.

In a case where the instruction does not indicate the setting the default separation color, whether or not the instruction indicates the cancellation of the default separation color is determined at step S171. If so, the default separation color which is stored in the ROM 207 is stored in the RAM 208 as the user setting default separation color at step S172, then the process moves to step S173.

At step S173, whether or not the separation color setting request by the user is completed is determined, and if not, the process moves back to step S161, whereas if so, the process is completed.

According to the sixth embodiment as described above, the inputted image can be divided into image areas depending upon their characteristics. Further, the separation color can be set in correspondence with the divided areas, and the output color can be also be set in correspondence with the separation color. Furthermore, the user is able to set or cancel the separation color corresponding to each area.

[Seventh Embodiment]

An image processing apparatus according to the seventh embodiment of the present invention will be explained below. Note that, in the seventh embodiment, the same or similar devices as in the first embodiment have the same reference numerals, and the explanation of those devices are omitted.

Figure 16:
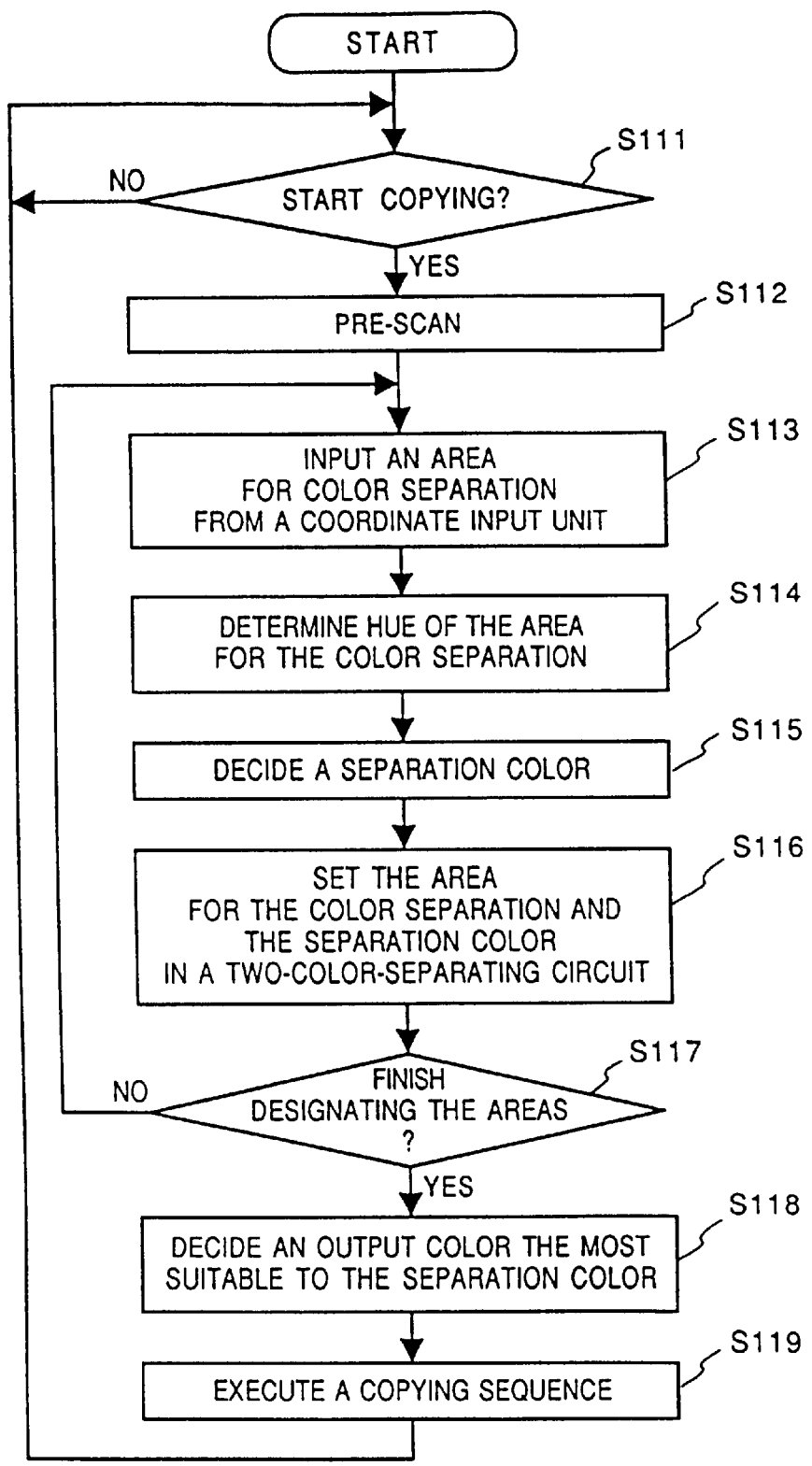
FIG. 16 is a flowchart illustrating process of an image forming according to a seventh embodiment.

FIG. 16 is a flowchart showing the image forming process in the seventh embodiment, and executed by the controller 205.

When an instruction, such as 'start copying', is issued by the operation unit 210 at step S111, the original 200 is pre-scanned at step S112. The image information of the original 200 is stored inside of the color determination circuit 308 via the image reader 201.

Successively at step S113, a user inputs an area for color separation by using the coordinate input unit 211.

Then at step S114, image data of each color are obtained from the color determination circuit 308 by designating the area for color separation in accordance with the area signal DOUT4, then hue of the original image is determined. At step S115, the separation color is determined in accordance with the hue, then at step S116, the separation color signal DOUT3 indicating the decided separation color and the area signal DOUT5 indicating the area for color separation are transmitted to be set in a table inside of the two-color-separating circuit 303.

Next at step S117, whether or not the user has finished designating the area for the color separation is determined. If so, the process proceeds to step S118, whereas if not, the process moves back to step S113.

When the designation of the area for the color separation is completed, there is determined the output color for outputting an image which is separated in accordance with the designated separation color based on decision information on the output color, where the information is stored in the ROM 207 or the RAM 208 in advance. Note that the developer of the color image forming unit 127 is selected corresponding to the decided output color.

Further at step S119, after a copying sequence is executed and an image is formed in dependence upon the designated output color by changing the separation colors corresponding to each image area according to the table, the process moves back to step S111, and the apparatus moves to a waiting state for another instruction.

According to the present embodiment as described above, by designating the desired areas for the color separation by the user, the separation color can be determined in correspondence with the hue in the designated area. Further, the output color can be also determined in dependence upon the determined color.

[Eighth Embodiment]

An image processing apparatus according to the eighth embodiment of the present invention will be explained below. Note that, in the eighth embodiment, the same or similar devices as in the first embodiment have the same reference numerals, and the explanations on those devices are omitted.

Figure 17:
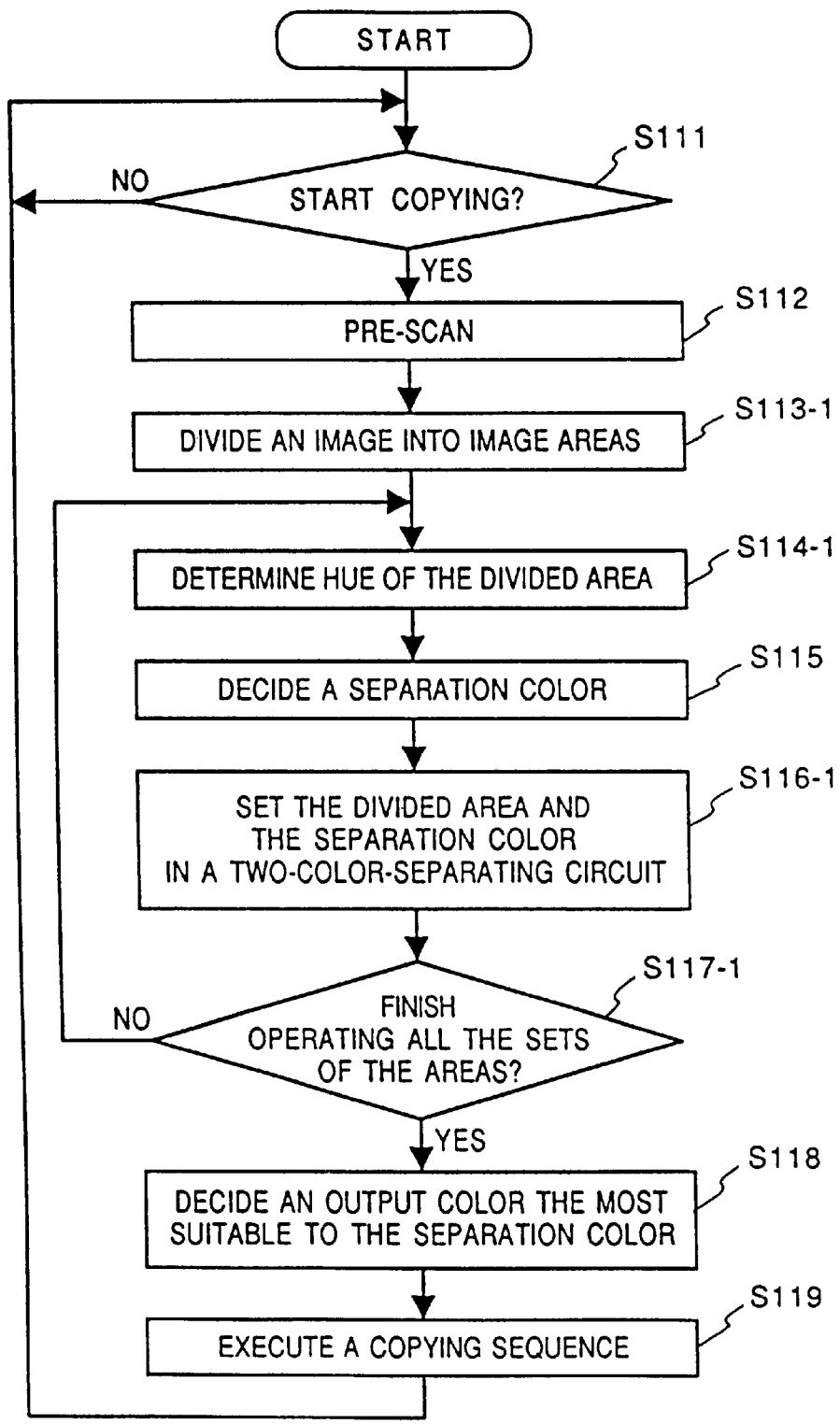
FIG. 17 is a flowchart illustrating process of an image forming according to a eighth embodiment.

FIG. 17 is a flowchart showing the image forming process, and executed by the controller 205. The same or similar processes as described in the seventh embodiment with reference to FIG. 16 have the same reference numerals, and the explanation on those steps are omitted.

At step S113-1, the pre-scanned image which is stored inside of the color determination circuit 308 is divided into image areas by the image area divider 310.

Image data of each color is generated from the color determination circuit 308 by designating the divided area in accordance with the area signal DOUT4, then the hue determination of the original image is performed at step S114-1. At step S115, the separation color is decided in accordance with the determined hue, next at step S116-1, the separation color signal DOUT3 indicating the decided separation color and the area signal DOUT5 indicating the divided area are transmitted to the two-color-separating circuit 303. These signals are set in the table inside of the two-color-separating circuit 303.

Successively at step S117-1, whether or not all the set of the divided areas were operated on, and if so, the process proceeds to step S118, and if not, the process moves back to step S114-1.

Following steps of the flowchart shows the same process as in the seventh embodiment, thus the explanations are omitted.

According to the present invention as described above, it is able to decide the separation color corresponding to the hue of the divided area which is obtained by dividing the image area of the inputted image. Further, the output color can be decided corresponding to the decided separation color.

[Ninth Embodiment]

An image processing apparatus according to the ninth embodiment of the present invention will be explained below. Note that, in the ninth embodiment, the same or similar devices as in the first embodiment have the same reference numerals, and the explanations on those devices are omitted.

Figure 18:
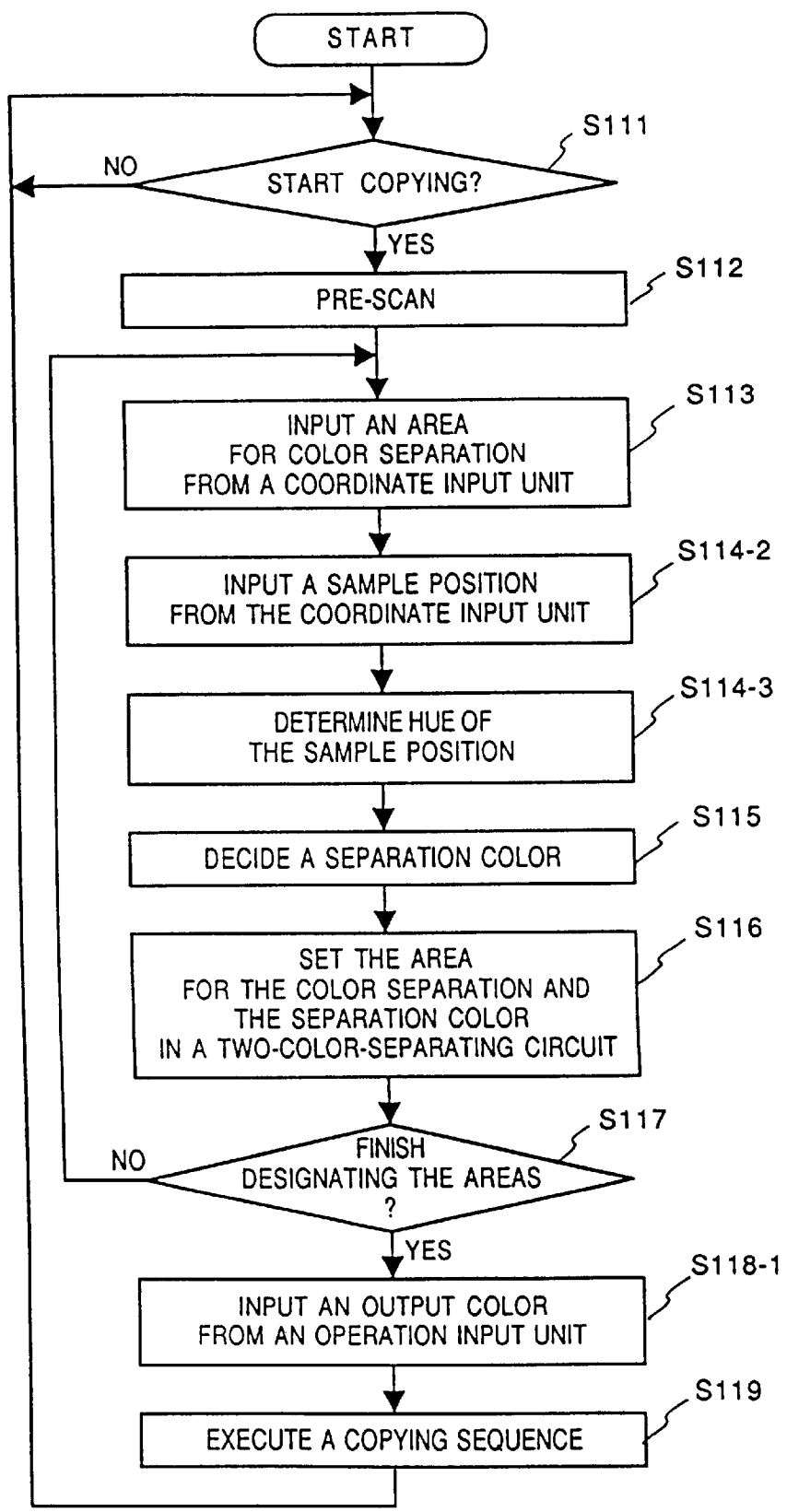
FIG. 18 is a flowchart illustrating process of an image forming according to a ninth embodiment.

FIG. 18 is a flowchart showing the image forming process, and executed by the controller 205. The same or similar processes as described in the seventh embodiment with reference to FIG. 16 have the same reference numerals, and the explanations on those steps are omitted.

At step S114-2, a user inputs the sample color position for hue determination of the original image by using the coordinate input unit 211. The position information is inputted to the controller 205.

Successively at step S114-3, by designating an area which is small enough to correspond to the designated sample color position by using the area signal DOUT4, image data of each color is generated from the color determination circuit 308. The hue determination of the original image is performed, then the separation color is determined depending on the determination result at step S115.

Steps S115 to S117 are the same processes as in the seventh embodiment, thus the explanation on those processes are omitted.

At step S118-1, the user inputs the desired output color by using the operation unit 210. Note that the developer of the color image forming unit 127 is selected on the basis of the designated output color.

The rest of the process in FIG. 18 are the same as in the seventh embodiment, thus the explanation on them are omitted.

According to the present embodiment as described above, the separation color of the inputted image can be decided in accordance with the user's needs by designating the desired area for color separation, the sample color position for determining the separation color, and the output color.

It should be noted that the aforesaid embodiments can be freely combined.

As explained above, it is possible to provide an image processing method and apparatus capable of detecting the hue of the color image information, then determining the color component to be separated depending on the detected hue, detecting the output color according to the decided color component, separating the color image information into image information on at least two color components, and outputting the separated color component image information as the image information on the output color. Further, the settings and the change of the separation color for the color separation become possible, thereby it becomes possible to improve the expression of the image forming.

Furthermore, the separation color for the color separation and the output color of the color separated image data are able to be selected individually. Therefore, the separation color and the output color can be freely set or changed, and thereby the expression of the image forming is improved.

Further, since the output color of the image forming device can be automatically selected in accordance with the separated color component, the operation to set and changing the separation color becomes easier, and the expression of the image forming can be improved.

Further, it is possible to set and change the separation color for the color separation in the desired area by automatic or easy manual operation, thus the expression of the image forming can be improved.

Further, it is possible to set and change the separation color for the color separation in each divided area by automatic or easy manual operation, the expression of the image forming can be improved.

Further, it is possible to freely selects the desired color to be separated by using the angle data which is predetermined in the linear operation operated at the separating time. Further, it makes it possible to widen the kinds of color recognized as the desired separation color, thereby the expression of the image by using two colors can be improved, and it is possible to form an image with two colors which is practical of copying a full-color image.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention.

Therefore, to apprise the public of the scope of the present invention, the following claims are made.

What is claimed is:

1. An image processing apparatus for separating two-color component data from input color image information which represents a full color image, comprising:

color determination means for counting frequencies of red, green and blue colors included in the full color image, and selecting a color from the colors in correspondence with comparison between the counted frequencies;

separating means for separating color component data corresponding to the selected color and black color component data from the color image information;

deciding means for deciding two-output colors; and output means for outputting the selected color component data and the black color component data separated by said separating means to an image forming apparatus which forms a two-color image on a recording medium using two color recording materials corresponding to the two-output colors.

2. The image processing apparatus according to claim 1, wherein said separating means separates the color component data from the color image information by performing a linear operation using predetermined angle data.

3. An image processing apparatus for separating two-color component data from input color image information which represents a full color image, comprising:

first designating means for designating a color component to be separated from the color image information in accordance with an instruction of a user;

second designating means for designating a type of color recording material for use by an image forming apparatus corresponding to the designated color component in accordance with the instruction;

separating means for separating the two-color component data from the color image information based on the designated color component; and output means for outputting the two-color component data as image data for the designated type to the image forming apparatus which forms a two-color image on a recording medium using two color recording materials.

4. The image processing apparatus according to claim 3, wherein said separating means separates the two-color component data from the color image information by performing a linear operation using predetermined angle data.

5. The image processing apparatus according to claim 3, wherein the two-color component data includes black component data.

6. The image processing apparatus according to claim 1, further comprising designating means for designating an area of the full color image, wherein said color determination means performs the count in the designated area.

7. An image processing method for separating two-color component data from input color image information which represents a full color image, comprising the steps of:

counting frequencies of red, green and glue colors included in the full color image;

selecting a color from the colors in correspondence with comparison between the counted frequencies;

separating color component data corresponding to the selected color and black color component data from the color image information;

deciding two-output colors; and outputting the selected color component data and the black color component data separated in the separating step to an image forming apparatus which forms a two-color image on a recording medium using two color recording materials corresponding to the two-output colors.

8. An image processing method for separating two-color component data from color image information which represents a full color image, comprising the steps of:

designating a color component to be separated from the color image information in accordance with an instruction of a user;

designating a type of color recording material for use by an image forming apparatus corresponding to the designated color component in accordance with the instruction;

separating two-color component data from the color image information based on the designated color component; and outputting the two-color component data as image data for the designated type to the image forming apparatus which forms a two-color image on a recording medium using two color recording materials.

* * * * *

UNITED STATES PATENT AND TRADEMARK OFFICE
CERTIFICATE OF CORRECTION

PATENT NO.    : 6,462,834 B1
DATED         : October 8, 2002
INVENTOR(S)   : Masahito Yamamoto et al.

It is certified that error appears in the above-identified patent and that said Letters Patent is hereby corrected as shown below:

Drawings,
Sheet 13, FIG. 13, "CHARACTOR" should read -- CHARACTER --;
Sheet 14, FIG. 14, "CHARACTOR" should read -- CHARACTER --; and
Sheet 15, FIG. 15, "CHARACTOR" (all occurrences) should read -- CHARACTER --.

Column 1,
Line 22, "to" should read -- that --; and
Line 54, "needs" should read -- need --.

Column 2,
Line 62, "forming;" should read -- forming according to a first embodiment; --.

Column 3,
Line 57, "processes" should read -- process --;
Line 58, "there" should read -- there is --; and
Line 64, "there" should read -- there is --.

Column 4,
Line 21, "resistration" should read -- registration --;
Line 43, 'resistration" should read -- registration --; and "137," should read -- 137; --;
Line 53, "sheet" should read -- sheet to --; and
Line 61, "130" should read -- 130. --.

Column 5,
Line 26, "resistration" should read -- registration --; and
Line 38, "in" should be deleted.

Column 7,
Line 3, "coefficient=×{M-" should read -- coefficient 32=×{M- --;
Line 21, "degree" should read -- degrees --;
Line 45, "be also" should read -- also be --; and
Line 63, "R O," should read -- R=O, --.

Column 8,
Line 42, "signal" should read -- signal, --.

Column 9,
Line 60, "be also" should read -- also be --.

UNITED STATES PATENT AND TRADEMARK OFFICE
CERTIFICATE OF CORRECTION

PATENT NO.    : 6,462,834 B1
DATED         : October 8, 2002
INVENTOR(S)   : Masahito Yamamoto et al.

It is certified that error appears in the above-identified patent and that said Letters Patent is hereby corrected as shown below:

Column 12,
Line 13, "input/the" should read -- input the --;
Line 26, "a" should read -- of a --; and "containing" should read -- containing a --; and
Line 43, "there" should read -- there the --.

Column 13,
Line 23, "be also be" should read -- also be --.

Column 14,
Line 8, "be also" should read -- also be --.

Column 15,
Line 12, "process" should read -- processes --;
Line 13, "explanation" should read -- explanations --; and
Line 52, "selects" should read -- select --.

Column 16,
Line 59, "glue" should read -- blue --.

Signed and Sealed this

Twenty-second Day of April, 2003

JAMES E. ROGAN
*Director of the United States Patent and Trademark Office*